2,869,793

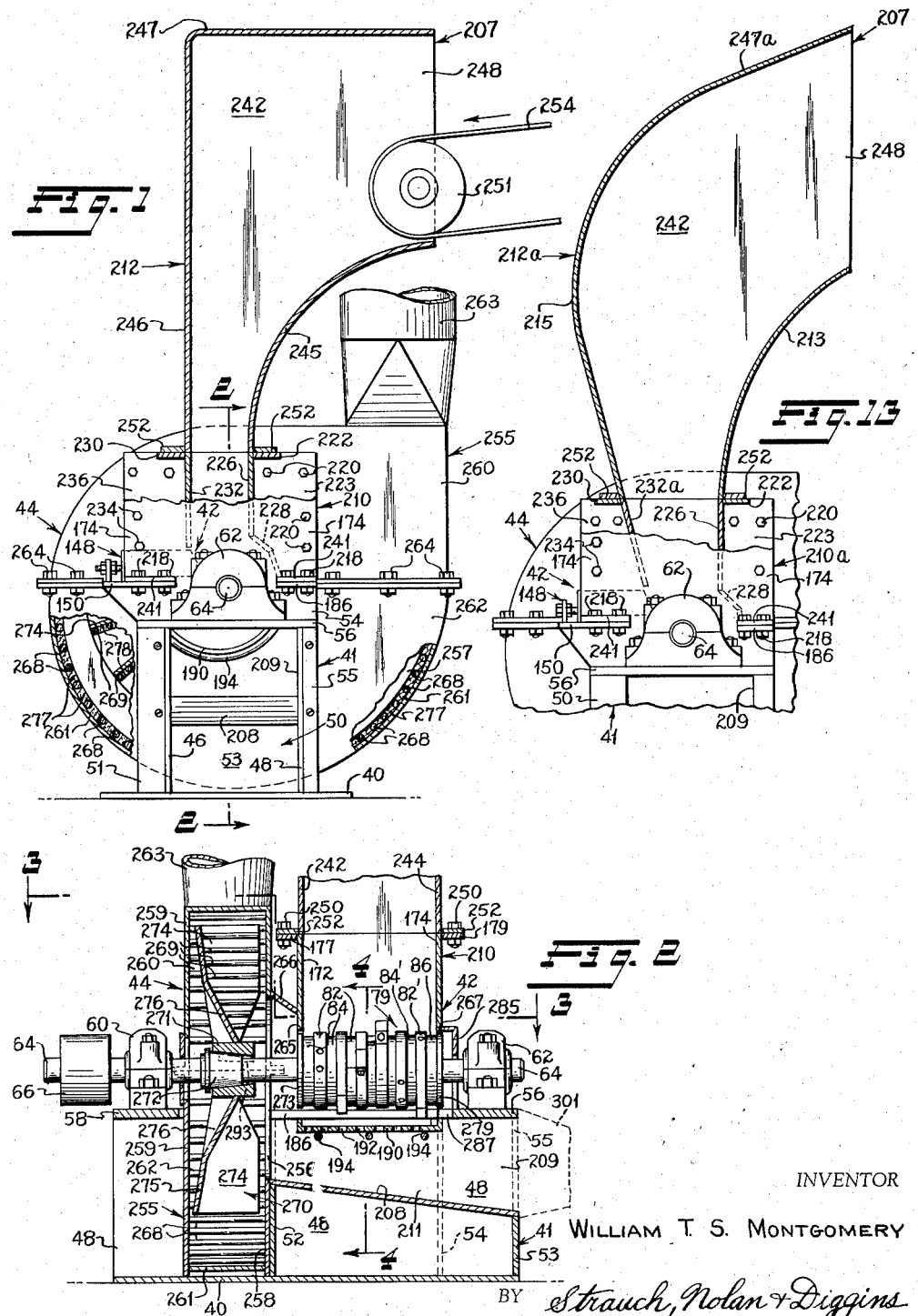

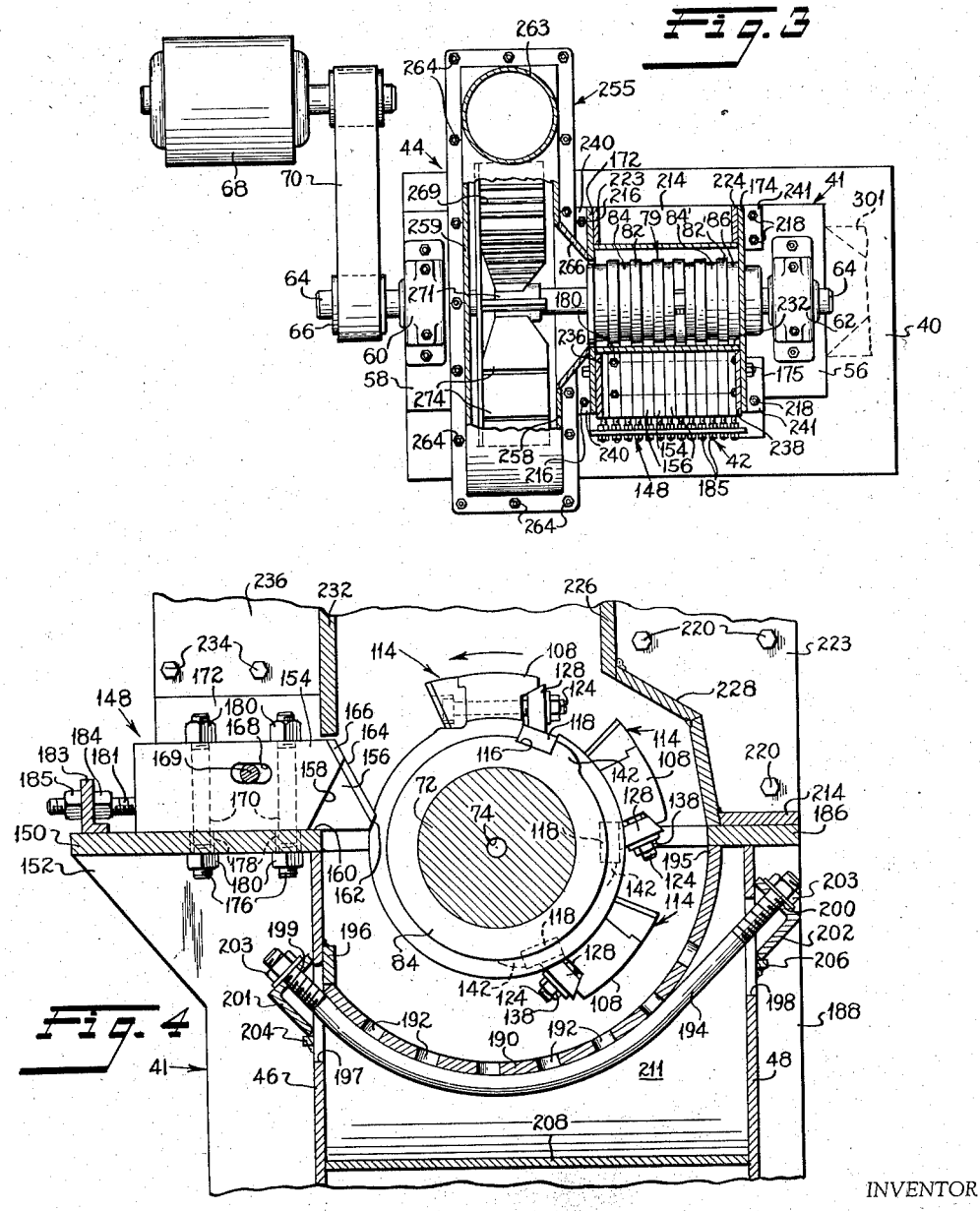

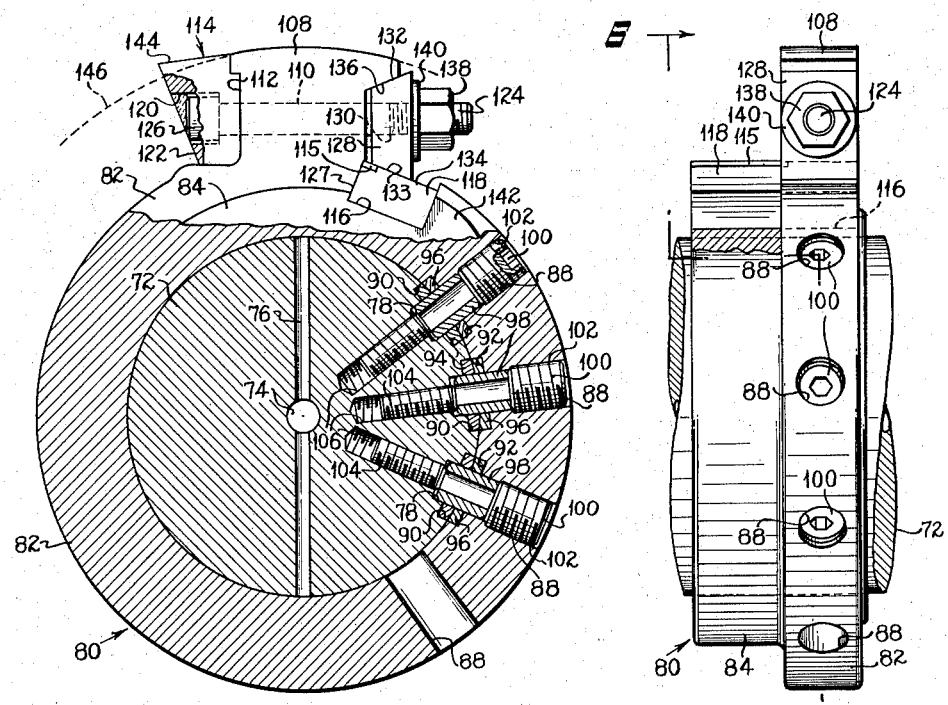
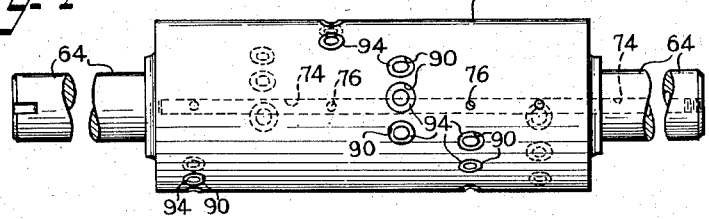
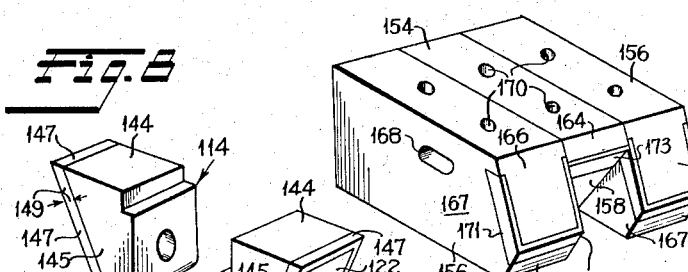

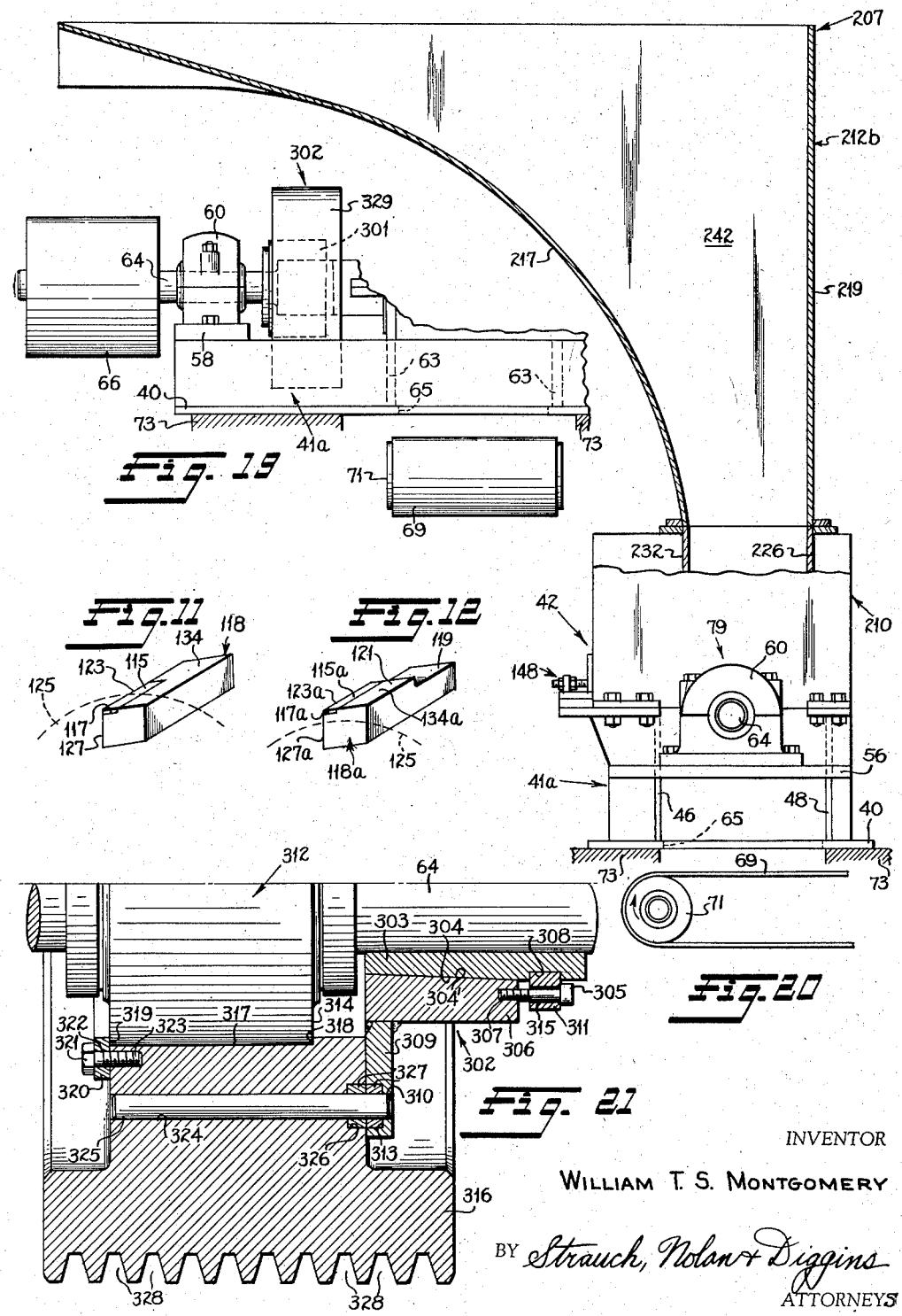

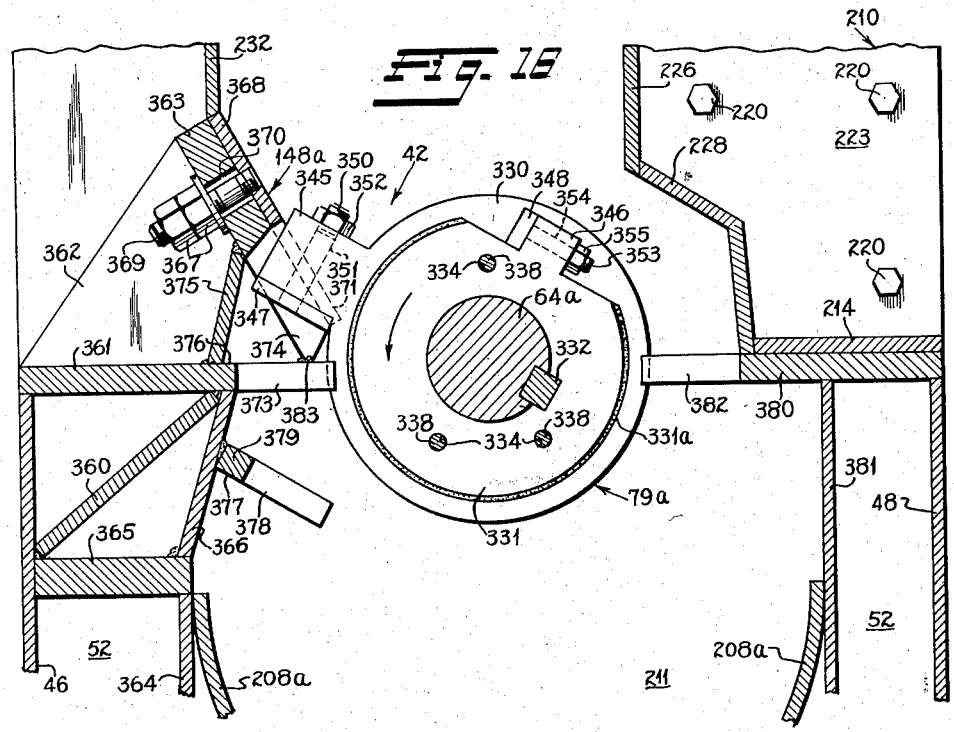
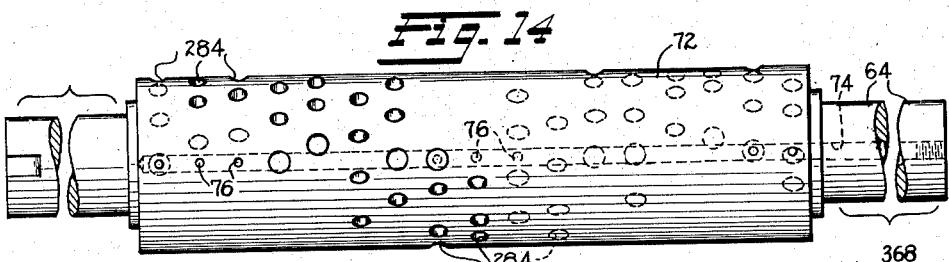
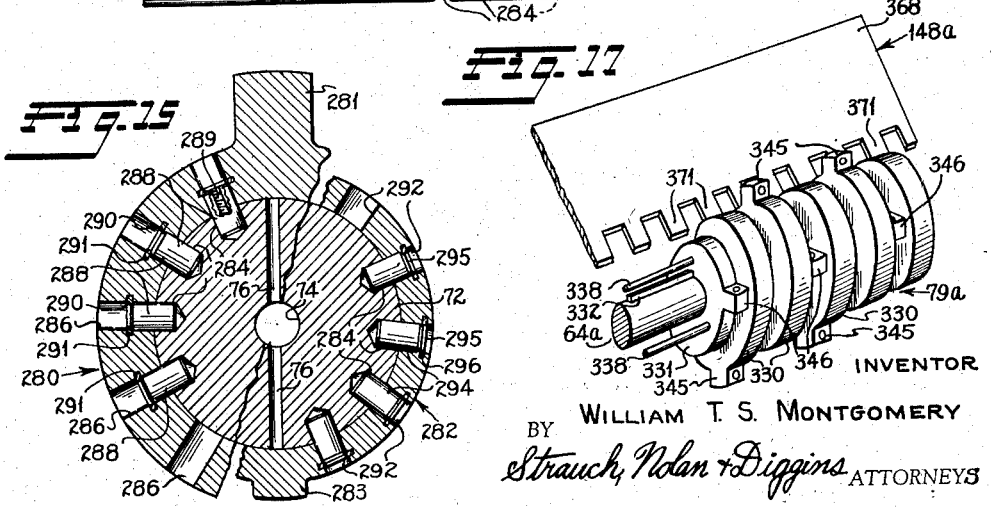
INVENTOR
WILLIAM T. S. MONTGOMERY
BY Strauch, Nolan & Diggins
ATTORNEYS Jan. 20, 1959     W. T. S. MONTGOMERY     2,869,793
MACHINE FOR PUNCHING AND CUTTING OF WOOD
Filed June 19, 1953     6 Sheets-Sheet 6
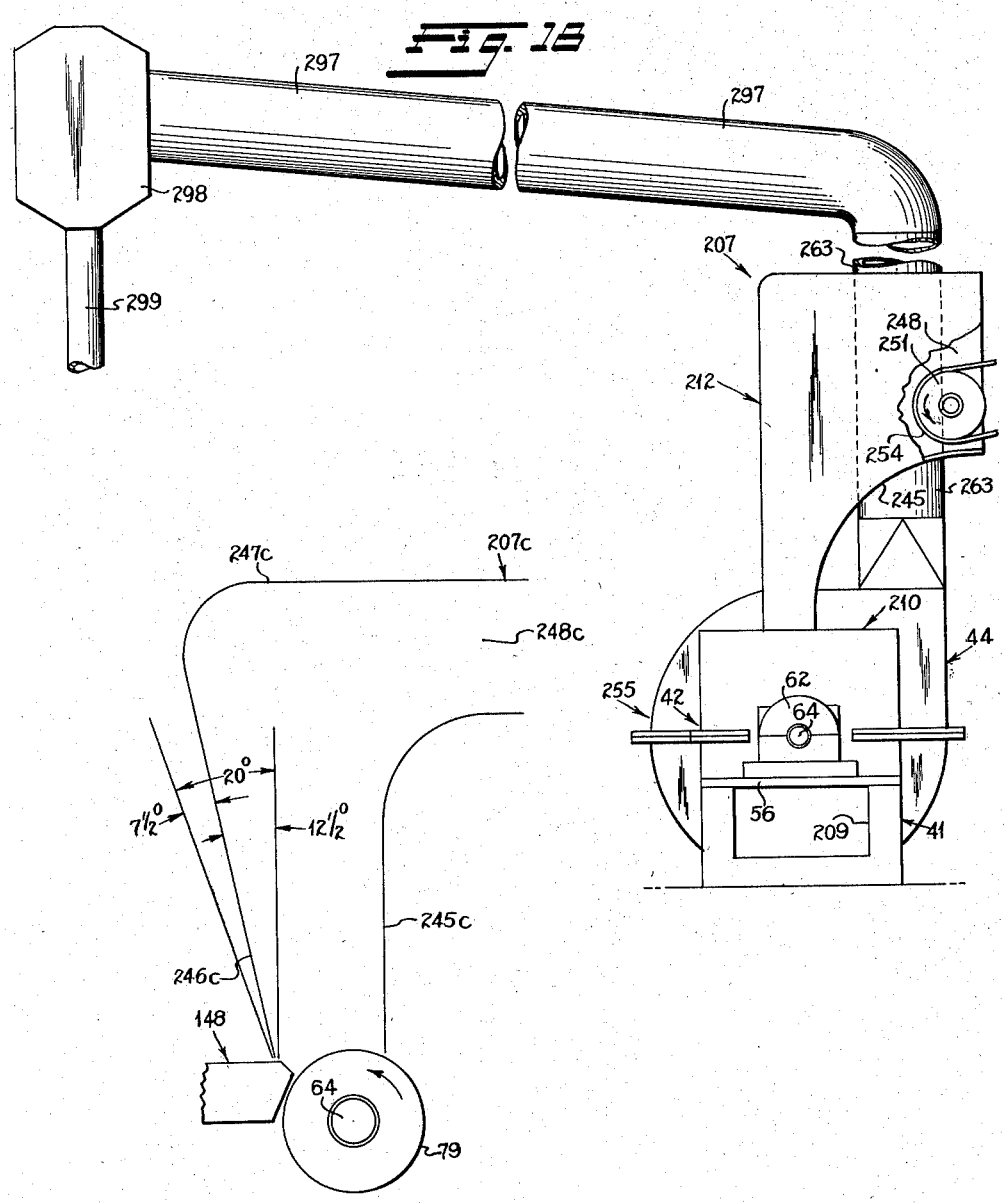
INVENTOR
WILLIAM T. S. MONTGOMERY
BY Strauch, Nolan + Diggins
ATTORNEYS

United States Patent Office 2,869,793
Patented Jan. 20, 1959

MACHINE FOR PUNCHING AND CUTTING OF WOOD

William T. S. Montgomery, Jacksonville, Fla.

Application June 19, 1953, Serial No. 362,790

35 Claims. (Cl. 241—50)

The present invention relates to the reduction and disposal of wood, and more particularly to apparatus for reducing chunks or pieces of wood to small size and conveying the reduced wood.

In wood working factories and mills there is a substantial amount of wood waste which occurs in a variety of forms such as saw dust, shavings, ends or chunks and log butts. The handling of this waste wood is a serious problem because the waste occurs in a variety of forms and conditions and heretofore it has been necessary to employ expensive hand labor to move this waste as it accumulates. In addition, wood waste has a fuel value which has heretofore not been fully utilized because the variety of sizes and forms of the waste prevents efficient burning. Thus, wood waste has constituted an expensive nuisance rather than a valuable by-product.

Nowhere is the problem of waste disposal more acute than in a veneer or plywood mill. In such a mill, the woods used range from hard tough woods such as pecan, hickory, walnut and mahogany to soft pine and the waste occurs in a wide variety of forms and conditions. There are huge dry log butts, wet bark, wet veneer and wet cores, dry veneer, plywood trimmings, saw dust, shavings, and other forms of waste. A veneer or plywood mill has a continuous need for fuel to generate the steam or heat the water used for soaking logs prior to turning in the veneer lathe. Yet much of the waste, wet bark, wet veneer and wet cores is so saturated with water that it will not burn and drying is a difficult and expensive task because the wet wood tends to rot or mildew.

Light dry waste, such as sawdust and shavings, may be readily handled by suction and conveyed to the point of disposal by a stream of air, but the disposal of chunks, cores, trimmings and ends presents a very serious problem because these pieces occur in a variety of shapes and sizes which are difficult to handle or stack and are often too heavy and bulky to handle by suction or other mechanical methods. Frequently, chunks are mixed with the light waste so that even the light waste cannot be effectively handled by machine.

The disposal of chunks of wood, or of mixed waste can be simplified by reducing the chunks to sizes which can be easily handled. The reduction of such chunks is difficult because of the nature of wood and due to the variety of forms and conditions in which the waste occurs. For efficient, economical operation, reduction should be done by machine and segregation of the different types and forms of waste for separate reduction would be impractical, expensive and uncertain. Thus in a veneer or plywood mill a reducing machine would have to handle such extreme forms of waste as log butts of hard, tough hickory, mahogany or the like, thin wet veneer which can be torn by hand, highly abrasive bark with a high sand content, and even a certain amount of so-called "tramp iron" such as nails, bolts or the like.

The reduction of wood is important in fields other than the disposal of wood waste. In pulp mills for example, it is necessary to reduce logs for the production of wood pulp. The reduction problem is quite similar to that involved in the reduction of wood waste but is somewhat less diffifficult. Pulp mills usually use a single type of wood so that the variations in hardness and toughness are absent, and the wood is almost always substantially dry.

The problem of reducing substances to smaller size is an old one and machines have been devised to reduce various substances. The design and operation of these machines is, however, so closely tied to the properties and characteristics of the material to be reduced that a machine for reducing one substance usually will not work with other and different substances. For example, machines have been devised for reducing hard, brittle substances such as coal and ice, and machines have been devised for reducing soft substances such as fodder but, prior to the present invention, no satisfactory machines have been devised for reducing wood. While the ice and coal reducing machines and the fodder reducing machines bear a superficial structural resemblance to the present invention, none of these machines could be successfully used to reduce wood waste.

The known types of apparatus for reducing brittle substances such as coal and ice operate by impact or crushing and, while such operations might splinter or split wood to a limited extent, they would not reduce it to sizes and forms convenient for handling.

Apparatus for reducing materials such as fodder would likewise not operate successfully on wood. The known fodder reducing machines operate on a cutting or shearing principle requiring sharp knife edges and close tolerances and these sharp edges and close tolerances could not be maintained with hard, tough material such as wood. Replacement and repair of the cutting blades would introduce an expense item so great that a machine operating on this principle would not be commercially practical.

Since neither the impact or crushing action of the coal or ice reducing machines, nor the cutting action of the fodder reducing machines may be successfully employed in the reduction of chunks of wood, I have found it necessary to employ an entirely different principle, that of punching or breaking small, easily handled pieces from a larger chunk or piece of wood. This punching or breaking action positively reduces the wood to suitable size as distinguished from the random crushing of the coal or ice breakers and does not depend upon cutting action as in the fodder reducing machines. In addition, this machine will handle wood waste in all forms from thin wet veneer to hickory or pecan logs and log butts. Also, through the use of a novel form of hard inlay in the present improvement of the invention I have been able to produce a secondary cutting action which supplements the fundamental punching action of the machine and thereby increases its efficiency.

Reduction alone converts the wood waste to a form which can be easily handled but reduced wet cores, wet veneer and wet bark of a veneer or plywood mill are still wet and unsuitable for use as fuel. I have found that by using suction to withdraw the reduced wood from the reducing machine and transmitting such wood by a blow pipe system, the small reduced pieces dry out during transit and are available for immediate use as fuel. It is thus possible to take a large, wet core from a veneer lathe and convert it to a useful fuel in a matter of seconds. The fuel value of the waste is thus immediately and continuously available to generate steam or heat water to saturate new logs for the veneer lathe.

In my copending application Serial No. 52,380, filed October 1, 1948, for "Wood Reduction and Handling," now abandoned, I have disclosed apparatus for reducing wood waste to small, easily handled pieces and conveying such reduced wood to a point of disposal such as a furnace. That apparatus, which is generally similar to that of the present invention, is highly efficient and successful in ordinary operation, but sometimes when exceptionally hard wood, stones or so-called "tramp iron" are introduced into the breaker mechanism, the breaker teeth may be broken off. The breaker teeth are of hard, tough steel and a broken tooth loose in the apparatus can and sometimes does cause serious damage.

In my later copending application Serial No. 119,713, filed October 5, 1949, for "Wood Reduction Mechanism," now abandoned, I disclosed an improvement of the invention disclosed in my application Serial No. 52,-380. The apparatus of the invention disclosed in that later application operates in the same general way as that disclosed in application Serial No. 52,380, but in the apparatus of the later application the construction of the machine as a whole is simplified and improved. A new type of fixed breaker for the breaker mechanism disclosed therein is adjustable and comprises a plurality of replaceable fixed breaker components. Also the new fixed breaker is stronger, more rigid, more accessible and more readily adaptable. Provision was also made to protect parts subject to breakage so as to prevent damage to the apparatus. This was accomplished particularly by utilization of a novel improved rotary breaker assembly having breaker rings independently mounted with overload means which will break driving connections before the breaker teeth or other important parts of the apparatus can be injured or broken.

The present application is a continuation-in-part of both my copending application Serial No. 52,380 filed on October 1, 1948, for "Wood Reduction and Handling," and my copending application Serial No. 119,713, filed October 5, 1949, for "Wood Reduction Mechanism."

The invention of the present application is an improvement over the inventions disclosed in my two earlier copending applications referred to above. The apparatus of the present invention is operated in the same general way as that disclosed in my two earlier applications, but in the present invention the construction of the reduction apparatus is simplified and many novel improvements have been added.

The construction of the tooth carrying rings on the rotary breaker has been simplified, and the breaker assembly overload protection means has also been simplified.

Novel and greatly improved removable teeth have been provided on the rotary breaker members. A novel relatively inexpensive form of mounting the removable rotary breaker teeth on the rotary members has also been provided. Provision has also been made of improved breaker teeth having a novel form of inlay of carbide or other hard material on the edges thereof which makes the teeth continuously self-sharpening during wood reducing operation resulting in a novel secondary cutting action which greatly improves the machine's efficiency.

A novel means has also been provided in cooperation with the breaker assembly which permits wood sufficiently reduced to be removed from the apparatus, but causes chunks of wood which are insufficiently reduced to be returned for additional reduction in the breaker mechanism.

The fan and fan housing have been modified by a novel and inexpensive means to minimize wear of those parts, thereby reducing maintenance costs. Also, various new improved hopper designs for different applications of my wood breaking apparatus are also disclosed herein.

One of the objects of the present invention is to provide a simple and effective apparatus for reducing any kind of wood in any form.

Another object is to provide apparatus for reducing chunks or pieces of wood to small size and for transporting such reduced pieces together with sawdust or shavings.

Another object is to provide a method and apparatus for converting wet wood into useful fuel.

A further object is to provide a wood waste disposal machine in which chunks or pieces of wood are reduced to small size and the reduced wood conveyed by a moving stream of air to a point of disposal.

A further object is to provide an improved fan for use in a blow pipe system.

Another object is to provide an improved fan having novel inexpensive means to minimize wear of the fan blades and other fan parts caused by impact of abrasive matter impelled against the fan during its operation.

Another object is to provide an improved fan housing having novel inexpensive means which minimize wear of the housing caused by particles of abrasive character thrown against the housing at high velocity as a result of fan operation.

Another object is to provide a wood breaker mechanism in which the teeth are protected against breaking loose from the power shaft.

Another object is to provide a power driven wood breaker mechanism in which hard foreign objects will cause disconnection of the power drive before the mechanism itself is damaged.

Another object is to provide a wood breaker mechanism in which the fixed breaker dies are individually adjustable and replaceable.

Another object of the present invention is to provide a simplified structure for the tooth bearing rings used in the rotary breaker member, and also to provide a simplified overload protection means used in mounting said rings.

A primary object of the present invention is to provide removable replaceable teeth members in the breaker assembly.

It is also an object of this invention to provide novel and improved removable teeth for the rotary breaker member.

A further object is to provide a novel means which performs a dual function of securing both a large and small removable tooth to the rotary breaker member.

A further object is to provide improved breaker teeth having a novel form of inlay of carbide, or other very hard material, which not only reduces wear of the operating surfaces but functions in a novel manner to make the breaker teeth continuously self-sharpening during the normal wood reducing operation, thereby achieving greatly increased machine efficiency at a small increase in production cost.

Another object is to also provide a novel hard inlay for the fixed breaker members which operates in an analgous manner.

Another object of the present invention is to provide a novel means in the breaker apparatus which permits wood reduced to desired size to be removed from the apparatus but prevents wood insufficiently reduced from leaving the breaker mechanism and causes it to undergo additional reduction in the breaker mechanism.

A further object of the invention is to provide different types of improved hopper designs for use in varying applications of the wood breaking apparatus disclosed herein.

A further object of the present invention is to provide a non-blower type of wood reduction apparatus which may be used with an existing wood handling system.

These and other objects and advantages will be found in certain novel features of the construction, arrangement and combination of the parts that will be hereinafter more fully set forth and pointed out in the appended claims.

Referring to the drawings:

Figure 1 is an end elevation view of the apparatus embodying my invention with parts of the hopper structure shown in section;

Figure 2 is a section taken on line 2—2 of Figure 1;

Figure 3 is a section taken on line 3—3 of Figure 2;

Figure 4 is an enlarged fragmentary section taken on line 4—4 of Figure 2;

Figure 5 is an enlarged end elevation of one of the breaker ring units;

Figure 6 is a partial section taken on line 6—6 of Figure 5;

Figure 7 is an elevational view of one type of rotor shaft for the breaker apparatus when rings of the type shown in Figures 5 and 6 are utilized;

Figure 8 is a perspective view of one of the large rotary breaker teeth with my novel form of carbide cutting edge inlay;

Figure 9 is a perspective view showing the forward face of the large rotary breaker tooth of Figure 8;

Figure 10 is a perspective view of a group of fixed breaker members showing the novel inlay of hard material on the operating surfaces;

Figure 11 is a perspective view of one form of small tooth of the type shown in Figures 5 and 6 having the novel carbide inlay;

Figure 12 is a perspective view of a modified form of small tooth having the novel carbide inlay;

Figure 13 is an end elevation of the embodiment of Figures 1-12 showing a modification of the hopper construction;

Figure 14 is an elevation view of a second type of rotor shaft employed in a modification utilizing a plurality of independently mounted large and small breaker rings;

Figure 15 is a vertical section of the rotor of Figure 14, showing partial sections of the large and small breaker rings used in this modification;

Figure 16 is an enlarged fragmentary section, similar to that of Figure 4, of another modification showing in detail a different type of breaker mechanism;

Figure 17 is a fragmentary and somewhat schematic perspective view of the fixed die plate and rotary breaker means employed in the modification of Figure 16;

Figure 18 is a schematic showing of a wood reducing and handling system utilizing the blower type wood reducing apparatus of the present invention;

Figure 19 is a fragmentary side elevation showing a non-blower modification of the breaker apparatus having a fly wheel installation in place of the fan, and a schematic showing of a conveyor belt chip removal system for use therewith;

Figure 20 is an end elevation of the modification of Figure 19, also showing a further modification of the upper hopper structure;

Figure 21 is an enlarged half-section of a novel improved combination pulley and fly wheel for use in a further modification of non-blower type breaker apparatus.

Figure 22 is a schematic representation of a hopper incorporating preferred features of hopper construction for use with the wood breaking apparatus of the present invention.

The disposal of wood waste or the production of wood pulp involves two distinct steps: (1) reduction of the wood to an easily handled size and (2) conveying the reduced wood to a convenient location for disposal or further treatment. The present invention involves both wood reduction and the handling of the reduced wood. The wood breaker of the present invention may be used with any type of conveyor and the conveyor may be separate from and independent of a breaker. However, in the preferred embodiment shown in Figures 1 to 18, inclusive, the breaker and conveyor are combined in a single machine.

Referring particularly to Figures 1-4, the apparatus comprises a base 40 which carries both the breaker mechanism 42 and a blower system 44 as hereinafter described. The breaker mechanism is mounted upon a frame 41 comprising longitudinal side walls 46 and 48, transverse end walls 50 and 52, and vertical braces 54 one on each side, all of which extend upward substantially vertically from the base 40 and are secured to each other to form the breaker apparatus frame structure as shown in Figures 1-4. End wall 50 consists of two vertical plates 51 and 55 welded to base 40, plate 56 and side walls 46 and 48, respectively, and a plate 53 welded to base 40, trough plate 208 and side walls 46 and 48. A relatively heavy support member 56 is secured substantially horizontally to the top edges of side walls 46 and 48, end wall 50, and to braces 54 above one end of the base 40. Another such support 58 is mounted in similar manner on side walls 46 and 48 above the opposite end of base 40 with its upper surface in substantially the same horizontal plane as the upper surface of support 56. Fan system 44 is mounted on base 40 adjacent wall 52 and support 58 as shown in Figure 2. However, wall 52 may be omitted and parts connected thereto can be connected to the lower half of fan housing wall 258 if desired. The walls, braces and horizontal supports may be secured to each other and base 40 by any suitable means, but I prefer to do this by welding for maximum rigidity and economical fabrication.

Mounted on the supports or beds 56 and 58 are two aligned bearings 60 and 62, respectively, within which the main shaft 64 is journalled. The shaft 64 is provided with a suitable pulley 66 adjacent the bearing 60 and may be driven by a motor or engine 68 through a suitable belt 70.

The breaker mechanism which consists of a toothed rotor and fixed dies is located between the transverse end walls 50 and 52, and between these walls, the shaft 64 has a portion 72 of greater diameter than the remainder of the shaft, as shown in Figure 7. The enlarged portion 72 of the shaft 64 is provided with a plurality of holes 78 (Figure 6) which, in the embodiment illustrated, are arranged in sets of three. The holes 78 of each set are in the same plane perpendicular to the axis of the shaft 64, and the sets are arranged in a spiral along the enlarged portion 72 of the shaft 64. A center bore 74 extends from the end of the shaft 64 adjacent the bearing 62 through the enlarged portion 72. A plurality of small grease holes 76 extend radially outward from the bore 74 to the surface of the enlarged portion 72, each one of such holes being in substantially the same plane as a set of holes 78.

Rotary breaker 79 comprises a plurality of ring units 80 of the type shown in detail in Figures 5 and 6, which are mounted along the enlarged part 72 of shaft 64. All but one of ring units 80, which may be forged or cast, includes a large ring 82 and a small ring 84 formed as an integral unit, as is clearly shown in Figure 5. One of the end ring units 80 consists of 3 rings, a center large ring 82' with two small rings 84' and 86, respectively, formed on each side thereof as indicated in Figure 2. Ring units 80 are mounted along shaft 64 so that large and small rings 82 and 84 are alternately placed as is clearly shown in Figures 2 and 3, with one ring unit 80 to each set of holes 78. When the holes 78 are arranged three to a set, each ring member is provided with four holes 88, extending radially through large ring 82 and having the same angular spacing between three of such holes as between the holes 78 of a set. As shown in Figure 6, each of holes 78 in shaft portion 72 is preferably provided with a small counterbore 90, and three of the radial holes in ring 82 are provided with a similar counterbore 92 at the inner circumference of ring unit 80. When counterbores 90 and 92 are provided, a pair of hardened steel bushings 94 and 96 are inserted in counterbores 90 and 92, respectively and their adjoining ends are suitably curved so that they mate, as shown in Figure 6. Steel bushings 94 and 96 may be omitted if desired. However, when provided as shown, these bushings do the actual shearing of the shear pins 98 upon overload, and this prevents wallowing and mutilation of mounting holes 78 and 88 in the rotor shaft 72 and ring units 80, respectively. Ring unit 80 is secured to the enlarged portion 72 of shaft 64 through the use of hollow shear pins 98 extending through holes 88 and into holes 78. Each shear pin 98 is held in place by a hollow head set screw 100 threaded into the threaded section 102 of hole 88 and the threads of set screw 100 may be burred to cause the screws to lock. Play between ring unit 80 and shaft portion 72 can be taken up by adjustment of set screws 100. The fourth hole 88 is provided to permit easy removal of any pin which may break, by means of hollow head screws 104 which are provided below each shear pin 98 in threaded undersize extensions 106 of mounting holes 78. Should pins 98 shear under overload conditions, hollow head screw 104 is utilized to back the broken part of pins 98 out of mounting holes 78 so that new shear pins may be inserted to remount the ring unit 80 on the shaft 72. The number of shear pins 98 for each ring unit and the number of holes 78 in each set, as well as the design and material of pins 98, determines the strength of the overload prevention connection between tooth supporting ring units 80 and shaft portion 72. A greater or lesser number of pins may be used for each ring unit depending on how much of a safety factor is desired.

Each large ring 82 of ring unit 80 is provided with a large tooth support 108 projecting substantially radially and having a bore 110 therein extending transversely of the ring's axis. The forward end of tooth support 108 has a tooth receiving recess 112 of suitable configuration, as shown in Figure 6, so that a removable large tooth 114 may be rigidly supported therein as described below.

A slot recess 116 of rectangular section is milled in the periphery of ring unit 80 across its full width just behind and extending slightly into tooth support 108 to receive a rectangular removable small tooth 118. Large tooth 114 has a bore 120 extending inward from its forward working surface 122, and head 126 of cap screw 124 is preferably welded in bore 120 for maximum rigidity. The rear of tooth 114 has a configuration corresponding to that of recess 112, and tooth 114 is mounted in that recess with cap screw 124 extending through bore 110. A wedge 128 having a hole 130 therein and a pair of sloping edge surfaces 132 and 133 is supported on screw 124 with said edges respectively engaging a sloping surface 136 at the rearward end of tooth support 108 and the top surface 134 of small tooth 118. Nut 138 (and washer 140) is tightened on screw 124 thereby producing a wedging action which retains large tooth 114 and small tooth 118 very securely on ring unit 80 in their respective mounting recesses 112 and 116. This novel tooth mounting means is relatively simple and inexpensive, yet it achieves the high degree of rigidity required in the breaker apparatus, permits easy quick removal and replacement of the rotary breaker teeth. A small built up section 142 is preferably provided on the small ring 84 just behind slot recess 116 to provide increased support for small teeth 118 against tangential forces applied thereto in breaking operations.

Top edge 144 of large tooth 114 preferably extends slightly beyond the extended base circle 146 of support projection 108 as shown in Figure 6. This produces an effect similar to that of saws of the type disclosed in United States Patent No. 7,603 to H. Knowles, and has been found to be more efficient than use of a large tooth having a top surface which lies substantially on base circle extension 146. The latter form, however, is fully operative and very satisfactory, and may be used if desired.

Teeth 114 and 118 may be of solid steel. It is preferable, however, to use the teeth shown in Figures 8, 9, 11 and 12 which have a novel form of inlay of hard material described in detail below.

Two forms of small teeth are disclosed in Figures 11 and 12. Tooth 118 of Figure 11 is of rectangular form as is the small tooth 118 shown in Figures 5 and 6. An inlay 115 of carbide, or other hard material, is bonded to tooth 118 in a recess 117 formed along that part of the leading edge of tooth 118 which will overlie the small ring 84 when the tooth is mounted in slot 116 of ring unit 80. In the embodiment of Figure 12, a portion of tooth 118a is milled away at one end forming a reduced section 119 and an enlarged section 121, the width of the latter being slightly greater than the thickness of small ring 84. An inlay 115a of hard material is bonded to tooth 118a in a recess 117a formed along the leading edge of enlarged section 121.

When tooth 118 is used, its leading edge 123 is at a slightly smaller radial distance from the axis of shaft 64 than the periphery of the large ring 82, and when tooth 118a is used, its leading edge 123a is at a slightly greater radial distance, as is indicated in Figures 11 and 12 by the position of dotted line 125 which represents the periphery of large ring 82.

Referring to Figure 4, a fixed breaker die 148 is mounted on a flat horizontal bed plate 150 which is welded to the top edge of longitudinal side wall 46 with the upper surface of the plate slightly above the axis of shaft 64. Plate 150 is supported also by part of the upper edge of transverse vertical support plate 54 and by one or more vertical gusset plates 152 welded on three edges to bed plate 150, side wall 46 and base 40.

As shown in Figures 4 and 10, the fixed breaker die comprises short breaker members 154 for cooperating with long breaker teeth 114, and long breaker members 156 for cooperating with the short breaker teeth 116. The long breaker members 156 are slightly narrower than the small rings 84 and the short breaker members are slightly wider than the large rings 82 to allow operating clearances. These breaker members 154 and 156 are spaced alternately along the bed plate 150 in alignment with the rings 82 and 84 respectively. Each short breaker member 154 has a die portion 158 which is positioned so that it will clear the outer edge of the cooperating long tooth 114, and extending rearward at an angle so as to expose a part of the bed plate 150 to form a ledge or shelf 160. Each long breaker member 156 has a portion 162 which projects between adjacent large rings 82 just clearing the cooperating short breaker tooth 118. As shown in Figures 4 and 10, the respective surfaces 164 and 166 of the breaker members 154 and 156 facing the rotor 79 are inclined at an oblique angle to the horizontal. Surfaces 164 and 166 of breaker members 154 and 156 may also be made vertical instead of oblique, but a slight oblique angle to the horizontal as shown is preferable.

In assembly, inclined surfaces 164 and 166 cooperate to form an inclined die plate at an angle downwardly and inward toward the rotary breaker 79 with teeth projecting from the edge of said die plate due to the extension of surfaces 164 to form projections 162 on large breaker members 156. The angle of the die plate thus formed causes wood resting on said plate to be urged by gravity toward the teeth 114 and 118 on rotary breaker 79.

Each breaker member 154 and 156 has an oversized transverse opening 168 and two vertical openings 170. A tie rod 169 extends transversely through the openings 168 and through an opening (not shown) in each side wall 172 and 174 of the breaker chamber. Both ends of the tie rod 169 are threaded and the rod is fixed in place by nuts 175 as shown in Figure 3. It is also possible to use a pair of tie rods 169, the second one extending through another set of holes 168 in the breaker members, but one tie rod is generally adequate. Other rods 176 extend through the vertical openings 170 in the breaker members 154 and 156 and through oversized openings 178 in the bed plate 150. These tie rods 176 are also threaded on both ends and are held in position by nuts 180. In order to adjust the individual breaker members 154 and 156 to secure proper spacing from the teeth 114 and 118, respectively, a bolt 181 is welded or otherwise secured to the back of each breaker member. These bolts 181 extend horizontally back from the breaker members through holes or notches (not shown) in an upright rib 183 which is welded or otherwise secured to the top of bed plate 150. Two nuts 184 and 185 are threaded on each bolt 181, on the inner and outer sides respectively of the rib or fence 183. The individual breaker members can be moved toward or from the shaft 64 and rotary breaker assembly 79 by adjustment of the nuts 184 and 185. When all of the breaker members 154 and 156 of the fixed breaker die 148 are in proper position, the nuts 175, 180, 184 and 185 are all tightened to hold the breaker members securely in place on bed plate 150.

Wood waste occurs in a variety of forms from wet veneer to dry log butts and these different forms have different breaking characteristics. For maximum breaking efficiency, it is sometimes desirable to increase or decrease the clearance between the fixed breaker die and the breaker rotor and my improved fixed breaker die permits such variations without sacrificing rigidity or strength.

Rotary breaker teeth 114 and 118, and breaker members 154 and 156 may be of solid steel but it is preferable for these parts to have an inlay of carbide or other hard material having the novel form described in detail below.

Referring particularly to Figures 8 and 9, an inlay 147 of carbide or other hard material is bonded to large tooth 114 in recesses provided at the forward edges of sides 145 and top surface 144 of tooth 114. The width 149 of the inlay strip on top surface 144 and sides 145, and of the recess in which it is bonded, is considerably greater than the thickness 151 of recess and inlay strip on the forward working surface 122 of tooth 114. By way of illustration, in a practice embodiment inlay width 149 may be ½ inch and inlay thickness 151 may be $\frac{1}{16}$ inch.

Referring to Figures 11 and 12, previously discussed, it will be noted that each of inlays 115 and 115a is applied in an analogous manner with its width along the top surface 134 (or 134a) of the tooth being considerably greater than its thickness along the forward surface 127 (or 127a).

Referring to Figures 4 and 10, each of the short and long breaker members 154 and 156 has an inlay of carbide or other hard material at its forward working end. As shown in Figure 10, a carbide inlay 171 is bonded to large breaker member 156 in recesses provided on each of sides 167 and on slanted surface 163 on the underside of breaker projection 162. The width of the inlay strip on sides 167 and slanted surface 163 is made considerably greater than its thickness on the slanted upper working surface 166, similarly to the inlay of rotary breaker teeth 114 and 118. A similar carbide inlay 173 is bonded in a recess along the upper edge of lower slanting die portion 158 of short breaker member 154 with its thin dimension on slanting surface 164, as is shown in Figure 10.

The use of such hard inlays having their narrow dimensions on the forward work face surfaces 122, 127, 127a, 166 and 164 of parts 114, 118, 118a, 156, and 154, respectively, has produced a number of unexpected results leading to considerably more efficient and economical wood reduction in my breaker apparatus.

In wood reducing operation, the working surfaces 122, 127, 166 and 164 on the rotary teeth and fixed breaker members are subjected to an appreciable amount of wear. Such wear is caused particularly by sand, pebbles, grit and the like which is generally present in the scrap lumber, bark, etc., which is to be reduced, and unavoidably finds its way into the breaker apparatus when such wood materials are reduced therein.

Referring to large tooth 114 of Figures 8 and 9, working surface 122 being steel is softer than the hard carbide inlay 147 along the tooth edge. Because of this, tooth surface 122 wears away more rapidly than the harder carbide inlay 147, and this results in a continuous gradual removal of support for the relatively thin forward edge of inlay 147 at the face 122 of tooth 114. Carbide and similar suitable hard inlay materials are quite brittle. Because of this, and because inlay 147 has its narrow dimension 151 along the edge of forward working surface 122, this gradual removal of support causes the thin edge of inlay 147 to gradually crack and splinter away in very small increments. Hence, as surface 122 wears away, this produces a continuously self-sharpening thin, hard carbide cutting edge along the working periphery of tooth 114.

Referring to Figures 11 and 12, above-described inlay 115 (and 115a) along the working portion of front surface 127 (and 127a) of small tooth 118 (and 118a) functions in the same way as inlay 147 of large tooth 114. As softer surface 127 wears away in wood reducing operation the thin edge of harder inlay 115 cracks away to produce a continuously self-sharpening cutting edge. Carbide inlays 171 and 173 on large and small breaker members 156 and 154, which cooperate with teeth 118 and 114 respectively, also function in a similar manner with the thin edges of harder brittle inlays 171 and 173 breaking away gradually as softer surfaces 166 and 164 wear away.

Use of hard inlays applied to all such members in this novel manner not only preserves the desired fundamental punching action between rotary teeth and fixed breaker members (described below), but also achieves a cutting action so that the scrap wood is reduced by a simultaneous combined cutting and punching action. The use of inlays applied in this manner has been found superior in actual operation to carbide inlays applied to parts 114, 118, 154 and 156 with their wide, instead of narrow, dimension on forward working surfaces 122, 127, 164 and 166, respectively. The latter type of inlay is fully satisfactory and operative and reduces wear of the softer steel part to which it is applied, but it does not provide a self-sharpening cutting edge and cutting action which produces the improved wood reduction achieved by the novel inlay of the present invention.

As shown in Figure 4, a flat horizontal plate 186 is welded to the top edge of longitudinal wall 48 with its upper surface in substantially the same plane as the upper surface of bed plate 150. Plate 186 is supported also by part of the upper edge of one vertical support plate 54 and by one or more vertical gusset plates 188 welded on three edges to plate 186, side wall 48 and base 40. The plate 186 may have teeth thereon projecting toward shaft 64 between large breaker teeth 114, like teeth 382 on plate 380 as shown in the modification of Figures 16 and 17 which is described below. It is sometimes desirable to prevent the passage of too much air past the breaker rotor and also prevent broken wood from coming back into the breaking zone and this is accomplished through the use of such a toothed plate. Alternatively, a separate toothed plate similar to plate 380 may be removably mounted on plate 186 below plate 214 of lower hopper section 210.

In the embodiment of Figures 1–13, however, a plate 186 having no projecting teeth is preferred in order to utilize a novel means provided herein which functions in cooperation with the breaker mechanism 42 to permit wood sufficiently reduced to be removed from the breaker apparatus, but causes chunks of wood insufficiently reduced to be returned to the breaker assembly for additional reduction.

This novel means comprises a perforated screen 190 removably mounted between walls 46 and 48 just below rotary breaker 79 and substantially longitudinally coextensive therewith. Screen 190 has a plurality of perforations 192 of suitable size so that pieces of wood insufficiently reduced are not passed through perforations 192. Screen 190 is suspended a suitable distance beyond the top surfaces 144 of large breaker teeth 114 so that wood insufficiently reduced is caught by large rotor teeth 114 and returned to the breaker mechanism 42 for additional reduction. Wood which is sufficiently reduced passes through the perforations 192 of screen 190 to the solid trough 208 below the screen. Screen 190 is suspended by a plurality of bent tie rods 194 with one end 195 abutting the underside of plate 186 and the other end abutting the edge of a small strip 196 attached to the inside of wall 46 by welding or the like. Tie rods 194 extend through holes 197 and 198 and corresponding holes 199 and 200 in angle iron strips 201 and 202, respectively, with the lower edges of strips 201 and 202 resting on small strips 204 and 206 welded to walls 46 and 48, respectively. Screen 190 is wedged securely in place by tightening nuts 203 threaded on each end of tie rods 194, as shown in Figure 4. Thus, use of screen 190 in this manner fixes the maximum size of the wood particles after reduction in the breaker apparatus.

Trough 208 extends between side walls 46 and 48 to form a channel 211, and is secured to end walls 50 and 52. The opening 209 formed by trough 208 and end wall 50 at the end of channel 211 comprises the air intake inlet in the blower type breaker apparatus of Figures 1–13. The other end of trough 208 is connected adjacent transverse end wall 52 to an opening 256 in the central portion of wall 258 of fan housing 255.

Referring more particularly to the breaker hopper structure in Figures 1 and 2, the hopper indicated generally at 207 preferably comprises a lower hopper section 210 and an upper hopper 212. Each of vertical side walls 172 and 174 of section 210 is a flat plate having a laterally extending upper flange 177 and 179, respectively, and a pair of lower laterally extending flanges 240 and 241, respectively, at each side thereof, as shown in Figures 1 and 3. In assembly, side walls 172 and 174 are bolted to plates 150 and 186 by means of bolts 216 and 218 extending through flanges 240 and 241, respectively, as shown in Figures 1 and 3. Lower hopper side walls 226 and 232 extend between walls 172 and 174 and are removably mounted thereon to provide ready access to the breaker mechanism 42. One of these side walls comprises a substantially vertical plate 226 which is welded at its lower edge to an angled or curved plate 228 (shown in dotted lines in Figure 1). Joined plates 226 and 228 are welded at their edges to a pair of flange plates 223 and 224, respectively, which extend laterally therefrom substantially at right angles to plate 226. A stiffener plate 222 is welded to the top edges of plates 226, 223 and 224, and an additional plate 214 is welded to the lower edges of curved or angled plate 228 and plates 223 and 224. Thus plates 222, 223, 224, 226, 228 and 214 form a lower hopper wall assembly which is readily removable. Lower hopper wall 232 is part of a similar removable wall assembly mounted above the fixed breaker 148. Plate 232 extends between side walls 172 and 174 and has a pair of flange plates 236 and 238 welded to its ends and extending laterally therefrom substantially at right angles. A small stiffener plate 230 is welded to the top edges of plates 232, 236 and 238. The movable wall 226-228 is secured to side walls 172 and 174 by a plurality of bolts 220 extending through suitable holes in flange plates 223 and 224 and corresponding holes in side walls 172 and 174, respectively. Similarly, removable lower hopper wall 232 is secured to side walls 172 and 174 by a plurality of bolts 234 extending through suitable holes in flange plates 236 and 238 and corresponding holes in walls 172 and 174. The entire lower hopper unit 210 is firmly secured to the frame 41 by bolts 216 and 218 extending through flanges 240 and 241 and plates 150 and 186, as has been previously described. The above-described structure results in a lower hopper section 210 of great rigidity, and removability of plates 232 and 226-228 by removing bolts 234 and 220 provides a means of easy access to the breaker mechanism 42.

Side walls 172 and 174 have semi-circular cut-out portions indicated at 265 and 267, respectively, in Figure 2. Cut-outs 265 and 267 closely surround the upper periphery of a pair of annular plates 273 and 279 secured to shaft 64 at the end of rotary breaker 79 in substantially the same planes as side walls 172 and 174, respectively, with the minimum clearance necessary to permit unobstructed rotation of plates 273 and 279. Plates 273 and 279 are removably secured to rotor 79 in any suitable manner, as by bolting them to the ends of enlarged shaft section 72. Thus, the annular plates 273 and 279 cooperate with the lower cut-out portions 265 and 267 of walls 172 and 174, respectively, to generally prevent wood from leaving the hopper unit 210, except by passing through the breaker apparatus 42 to channel 211 and trough 208. A small amount of fine chips leaks through the said clearances between the periphery of annular plates 273 and 279 and cut-outs 265 and 267, respectively. A U-shaped cover plate 285 forms an extension of wall 174 and closely surrounds shaft 64 so that small particles leaking through said small clearance in wall 174 fall through a cut-out 287 in plate 56 into channel 211. Particles leaking through the clearance in wall 172 fall directly into channel 211 as is apparent in Figure 2.

Referring to the embodiment of Figure 1, the upper hopper indicated generally at 212 has substantially vertical side walls 242 and 244 which extend upward from the walls 172 and 174, respectively, as shown in Figure 2. The hopper 212 also has a front wall 245, rear wall 246, a top 247 and an opening 248. As shown in Figure 1, rear wall 246 is substantially straight and vertical, and front wall 245 is arcuate with the lower ends of both walls being substantially the same distance apart as walls 226 and 232 of lower section 210. Hopper 212 is secured to lower hopper section 210 by a plurality of bolts 250 extending through holes in laterally extending flanges 177 and 179 on side walls 172 and 174 and corresponding holes in a flange 252 attached to and extending around the periphery of the base of hopper 212. Flanges 252 at the lower ends of hopper walls 245 and 246 rest on stiffener plates 222 and 230, and it is generally unnecessary to have any bolts through these plates.

The purpose of the upper hopper is to guide wood to the breaking area, and the inclination and configuration of the walls can be varied within certain limits. The wood should be directed toward the fixed breaker die 148 rather than toward the plate 186, as the projections on the rotary breaker assembly on their upward travel drive the wood upward toward the top of the hopper. For this reason, I prefer to provide the hopper with a top portion, such as 247 in Figure 1, which extends from the rear wall 246 to the front of the wall sections 242 and 244. Also, to prevent wood being driven upward, wall 226 and the base of hopper front wall 245 are in a plane which is as close to the axis of shaft 64 as is practical. Plate 228 is angled or curved so that substantially vertical wall 226 may be disposed relatively close to the axis of shaft 64. This maximizes horizontal, and minimizes vertical, components of force applied to falling wood as it is struck by the teeth of rotary breaker assembly 79 thereby producing an effect which tends to drive the wood away from front wall 245 and hopper inlet 248 and towards rear wall 232 and fixed breaker die 148. Wood to be reduced is fed into the hopper through opening 248, and this is frequently done by a conveyor belt 254 which passes over a pulley 251 at the entrance of the hopper.

Referring to Figure 13, the modifications disclosed therein consists of a blower type breaker apparatus identical with that disclosed in Figures 1–12, with the exception that it has a modified form of hopper. For clarity, like parts are identified with the same numerals used for the embodiment of Figures 1–12. The hopper comprises a lower hopper section 210a and an upper hopper 212a. One side wall assembly of lower hopper section 210a, which is substantially identical with unit 210 (previously described) comprises plates 222, 226, 228, 214, 223 and 224 welded or otherwise secured together at their edges and ends in the same manner as in the embodiment of Figure 1. Lower hopper wall 232a is part of a similar removable wall assembly and comprises plates 230, 232a, 236 and 238 welded or otherwise secured together in the same manner as the corresponding parts in the embodiment of Figure 1. However, instead of being vertical in assembly, wall 232a is inclined at an acute angle to the vertical as shown in Figure 13, such angle preferably being between 12½° and 20° as in Figure 22. Walls 226—228 and 232a are removably secured to side walls 172 and 174 by bolts 220 and 234 as in the embodiment of Figure 1. Also, the lower hopper section 210a is secured to plates 150 and 186 by bolts 216 and 218 as in the embodiment of Figure 1.

The upper hopper 212a of Figure 13 comprises a curved front wall 213 and curved rear wall 215, connected by substantially vertical side walls 242 and 244, and providing a top section 247a and an opening 248. The lower portion of rear wall 215 is straight and, being inclined at a similar angle, it forms a continuation of wall 232a. Upper hopper 212a is connected to lower section 210a by bolts 250 through flanges 177 and 179 as in the embodiment of Figure 1.

*Operation of the breaker mechanism*

As pointed out above, ring units 80 are mounted on shaft portion 72 so that successive projections 108 are angularly and axially spaced in a spiral around shaft portion 72. As a result, large teeth 114 and small teeth 118 are similarly angularly spaced in a double spiral around shaft portion 72 with each small tooth 118 being spaced slightly behind its associated large tooth 114. A piece of wood dropped into hopper 212 finally comes to rest against the fixed breaker unit 148 and slides down the sloping surface of the large breaker members 156 until it comes to rest against the round part of the ring units 80, and particularly large rings 82. As the shaft 64 turns, large teeth 114 break or punch pieces out of the wood between the large breaker members 156 of fixed breaker assembly 148. After the shaft 64 has made a complete revolution, the large tooth 114 on each projection 108 has punched out its piece so that the lower edge of the piece of wood has a toothed shape similar to the edge 371 of plate 368 in Figure 17. The wood then drops down until the teeth left on the wood between the sections punched out by large teeth 114 rest on the cylindrical portions of the small rings 84. The small teeth 118 projecting from small rings 84 then break off the teeth left on the piece of wood by large teeth 114. At the same time, the large teeth 114 are breaking or punching out new pieces from the wood. This action continues until the piece of wood is wholly consumed. Because the projections 108 and corresponding teeth 114 and 118 progress angularly in a double spiral, as described above, stresses on the shaft 64 and breaker assemblies 79 and 148 are kept more or less uniform.

In the above description, the operation is described with respect to a single piece of wood resting flat against the fixed breaker die 148 with the shaft 64 rotating at slow speed. However, in actual operation, boards and chunks of wood are thrown into the hopper 212 in random fashion so that they reach the breaking area at various angles and the shaft 64 rotates at high speed usually between 800 and 1600 R. P. M. so that there is substantial turbulence at the breaking area 42. The teeth 114 and 118 and fixed breaker 148 nevertheless operate in substantially the manner described above, and the various angles of approach of the wood turbulence, and other factors affect only the size and shape of the broken or punched out pieces and not the fundamental manner of operation of the breaker apparatus.

When teeth having the above-described novel form of carbide inlay are used, an appreciable cutting action takes place simultaneously with the punching action here discussed, resulting in a considerable increase in wood reduction efficiency.

Sometimes an exceptionally hard piece of wood, or a stone or a piece of so-called tramp iron, is fed into the hopper with the wood to be reduced, and such materials would be sufficient to break off the teeth 114 or 118 and possibly wreck the apparatus. In order to prevent such damage, the shear pins 98 are made weaker than the teeth 114 and 118, respectively, so that these pins will break before the teeth. Upon breakage of the pins 98, the ring unit 80 is free to rotate relative to the enlarged portion 72 of shaft 64, so that even though the shaft 64 continues to rotate the particular ring unit whose tooth engages the hard material will be released from driving engagement with the shaft without disturbing any other ring and without serious damage to the mechanism. Grease is introduced between the ring unit 80 and the enlarged portion 72 of shaft 64 through the bore 74 and holes 76, and this prevents a free ring unit from freezing or sticking to the shaft 72 or adjacent ring units 80.

Should the pins connecting one or more rings to the shaft break, the shaft 64 is stopped and one or both of walls 232 and 226—228 are removed by removing bolts 220 and 234. The particular ring unit is turned until the fourth hole, which is oversized is over a broken pin and a tool is inserted into the hole at the end of screw 104 to rotate the same to back the broken shear pin portion out from the hole 78. Set screws 100 are removed and the broken shear pin portions remaining in the ring unit 80 can be pushed out of holes 88 in unit 80. New shear pins 98 are then inserted and the apparatus is again ready to operate.

Two different modifications of the breaker apparatus are disclosed in Figures 14 and 15, and in Figures 16 and 17, respectively. For purposes of clarity, parts identical with like parts in the embodiment of Figures 1–12 will be identified by the same numerals.

Referring to Figures 14 and 15, the modified breaker apparatus disclosed therein has been disclosed in my earlier copending application Serial No. 119,713 filed October 5, 1949. This breaker apparatus is the same as that of the embodiment of Figures 1–12, heretofore described, excepting for the structure of the rotary breaker unit corresponding to rotary unit 79 in Figures 1–7.

In the rotary breaker assembly of this modification, a plurality of large rings 280 and small rings 282 are mounted alternately along the enlarged portion 72 of the shaft 64, one ring for each set of holes 284, which are similar to holes 78 in Figure 7. Rings 280 and 282 are not formed together as a unit like rings 82 and 84 of ring unit 80 but are individual rings similar in form to large rings 330 and small rings 331 shown in the embodiment of Figures 16 and 17. When the holes 284 are arranged four to a set, as in Figure 14, each large ring 280 is provided with five radial holes 286 with the same angular spacing between four of the holes 286 as between the holes 284 of a set. The large ring 280 is then secured to the enlarged portion 72 of the shaft 64 by shear pins 288 extending through holes 286 into holes 284. A snap ring 290 in a groove 291 in the wall of the holes 286 holds the pin 288 in place. The fifth hole 286 is provided to permit withdrawal of any pins 288 which may break and, to facilitate easy removal, I prefer to tap the pins 288 as indicated at 289. The small rings 282 have holes 292 similar to the holes 286 and are similarly secured to the enlarged portion 72 of shaft 64 by shear pins 294 which are held in place in holes 284 by snap rings 295 in grooves 296. The number of shear pins 288 and 294 for each ring and the number of holes 284 in each set determines the strength of the connection between the ring and the enlarged portion 72 of shaft 64, and a greater or less number of shear pins can be used for each ring depending upon whether a stronger or safer connection is desired.

Each large ring 280 is provided with a large radially projecting tooth 281 and each small ring 282 is provided with a radially projecting tooth 283. The tooth 283 is much shorter than the tooth 281 and its maximum radius is less than the radius of the large ring 280. Large and small rotary breaker teeth 281 and 283 cooperate with fixed breaker members 154 and 156, respectively, in the same manner as large and small teeth 114 and 118, respectively of the embodiment of Figures 1–12.

For economy of manufacture, I prefer to make all of the large rings 280 alike and all of the small rings 282 alike. In order to achieve suitable dynamic balance in the rotary breaker assembly, it is desirable for each successive large tooth and each successive small tooth to be angularly as well as linearly spaced from adjacent teeth. For that reason, the sets of holes 284 which determine the positions of the teeth, are arranged substantially spirally on the circumference of enlarged portion 72 of the shaft 64. The relatively high speed of shaft rotation required for efficient fan operation causes great turbulence in the breaker and I prefer to have only a single tooth on each disc 280 and 281 in order to keep this turbulence at a minimum. Arrangement of single teeth in a single spiral around the rotor portion 72 causes the strain on the shaft 64 to be substantially uniform and constant.

Should the shear pins connecting one or more rings 280 and 282 to shaft 72 break due to any obstruction, the ring will rotate freely on the shaft thereby preventing damage to the apparatus. The shear pins are then removed by turning the fifth hole over a broken pin, inserting a threaded tool into the tapped hole 289, and pulling the pin portion out of hole 284. The broken pin portions remaining in the ring are pushed into holes 284 and then similarly withdrawn. New shear pins are inserted and the apparatus is again ready for operation.

Although the rings in the embodiments of Figures 1–10 and 14–15 have been described as mounted on enlarged portion 72 of rotor shaft 64 so that the rotor teeth lie in a double spiral around the shaft in the former embodiment and in a single spiral in the latter, other arrangements omitting this spiral feature may be used with satisfactory results. For example, in the embodiment of Figures 1–10, ring units 80 may be mounted along the shaft 64 with each tooth support 108 being angularly displaced 180° with respect to the support 108 on each of the two adjacent ring units. Similarly, in the embodiment of Figures 14–15 rings 280 and 282 may be mounted along shaft portion 72 progressively displaced 90° with respect to the next preceding ring in the same manner as the rings 330 and 331 in the modification of Figures 16 and 17, which will now be described in detail.

Referring to Figures 16 and 17, the modified breaker apparatus disclosed therein has been disclosed in my earlier copending application Serial No. 52,380, filed October 1, 1948. This breaker apparatus differs in a number of details, particularly in the breaker mechanism 42, from the two improved embodiments of Figures 1–10 and 14–15, heretofore described. However, the fundamental mode of operation of this embodiment is substantially identical with that of the two improved embodiments, and it is highly efficient and successful in ordinary operation.

The embodiment illustrated in Figures 16 and 17 comprises a base plate (not shown but similar to base plate 40) supporting a pair of spaced transverse parallel vertical plates 50 and 52 (50 is not shown) and a pair of vertical longitudinal side walls 46 and 48 are secured to said transverse plates and the base plate. Shaft 64a is rotatably mounted at each end in a pair of bearings such as 60 and 62 in a manner similar to mounting of shaft 64 in the embodiment of Figures 1–12. However, shaft 64a differs from shafts 64 of Figures 7 and 14 in that it does not have an enlarged portion 72 with mounting holes therein. The rotary breaker assembly 79a and a fan 270 are mounted on shaft 64a between the bearings at each of its ends as in the embodiments of Figures 1–12 and 14–15; as heretofore discussed.

The breaker mechanism illustrated in Figures 16 and 17 consists of a rotary breaker assembly 79a and a fixed breaker die plate assembly 148a. The breaker assembly consists of a plurality of hubs or rings 330 and 331 nonrotatably fixed on the shaft 64a by a key 332. These rings 330 and 331 are flat, relatively thick discs. The rings 331 are smaller than the rings 330, and rings 330 and 331 are mounted alternately along the shaft 64a, as are rings 280 and 282 in the embodiment of Figures 14 and 15. Each of the hubs 330 and 331 is provided with a plurality of spaced transverse holes 334. In assembly, a plurality of tie rods 338 are passed through the holes 334 in hubs 330 and 331 and hubs 330 and 331 on shaft 64 are drawn tightly together through tightening of nuts not shown. The peripheral edges of the two outer pairs of hubs 330 and 331 are preferably welded together (as shown at 331a) to provide greater rigidity. The center bores of the outer hubs 330 and 331 at each end of the breaker assembly may be tapered to receive a tapered split bushing having a flange or collar provided with holes corresponding to the tie rod holes, as shown in my copending application Serial No. 52,380. If desired, each such bushing may be provided with a keyway for receiving the key 332 and may also be keyed to the hubs 330 and 331 by a key, as shown in my earlier application. When those bushings are pulled tight by the tie rods 338, they firmly grip the shaft 64a and hold the hubs 330 and 331 against axial movement along the shaft 64a.

Ordinarily, in this embodiment, it is preferred to form the breaker assembly of separate hubs 330 and 331 as described, but the entire breaker assembly can be cast as a single unit. Whether the breaker assembly is formed of separate hubs or formed as a single casting, the general configuration of the unit will be the same.

Each hub 330 is provided with a radial projection 345 and each hub 331 is provided with a radial projection 346. The radial projections 346 on the hubs 331 are short of the body portions of the hubs 330 as shown in Figures 16 and 17.

The hubs 330 and 331 are mounted alternately on the shaft 64a and the angular positions of the projections 345 and 346 relative to the key 332 progress from one hub to the next. Thus, as shown in Figure 17, beginning with the third hub, the projection 345 on the hub 330 is at the top, the projection 346 on the next adjacent hub 331 is horizontal, ninety degrees from the projection 345, and the projection 345 on the next hub 330 is at the bottom, ninety degrees from the projection 346, and so on.

In order to reduce wear of the projections, a wear plate 347 of hard, tough material such as armor plate steel is secured on the breaker face of each projection 345 and a similar wear plate 348 secured on the breaker face of each projection 346. These wear plates 347 and 348 could be welded to the projections 345 and 346, respectively, but I prefer to have the wear plates detachably secured to the projections so that they may be readily and economically replaced when worn or damaged.

Each wear plate 347 has a center hole within which a bolt 350 is welded. This bolt 350 extends through a hole 351 in a projection 345 and a nut 352 secures the wear plate 347 to the projection 345. A bolt 353 is similarly secured in a center hole in each wear plate 348, extends through a hole 354 in a projection 346 and is secured to the projection 346 by a nut 355. Most of the wear on the wear plates 347 and 348 occurs at their outer edges and I prefer to make the wear plates 347 and 348 square so that the plates can be removed and replaced with a different side at the outer edge. In this way, the useful life of the wear plates may be substantially increased.

The rotary breaker assembly 79a cooperates with a die plate assembly indicated generally at 148a in Figure 16. The die plate assembly consists of a flat plate 361 supporting a plurality of spaced triangular uprights 362 to which a die support 363 is rigidly secured by a suitable means such as welding.

The outer edge of the flat plate 361 rests on the side wall 46 and may be welded thereto. To further support the die plate assembly, I provide an upright wall 364 spaced from the wall 46 and a horizontal support 365 is welded or otherwise secured to the walls 46 and 364. A brace 366 is welded along one edge on the support 365 and along the other edge to the flat plate 361. This brace 366 is inclined outward so as to give maximum support near the edge of the plate 361 adjacent the breaker assembly. In order to provide added rigidity to the die plate assembly, a second brace 360 extends between the junction of wall 48 and support 365 and the junction of brace 366 and plate 361. This second brace 360 is preferably welded at both junctions.

The die plate 368 has a plurality of holes in which bolts 369 are welded. These bolts 369 extend rearwardly from the die plate 368 through holes 370 in the die support 363 and the die 368 is secured in position on the die support 363 by nuts 367. The holes 370 are substantially larger than the bolts 369 so that the die plate 368 may be adjusted with respect to the die support before it is locked in position by the nuts 367. This adjustment is made in final assembly with the breaker hubs in place.

The die plate 368 is formed of hard, tough material such as armor plate steel and has a series of teeth 371 along the edge adjacent the hubs 330 and 331 and the teeth 371 are spaced apart sufficient to clear the projections 345 on the hubs 330. The die 368 is fixed relative to the hubs 330 and 331 so that the projections 346 and hubs 331 clear the ends of the teeth 371 and the projections 345 on hubs 330 clear the bottoms of the spaces between the teeth 371. The clearances between the teeth 371 and the projections 345 and 346 are preferably such that there is no contact between the die 368 and the hubs 330 and 331. I have found that clearances of 1/32 of an inch are satisfactory, but greater or less clearances may be used. In order to assure proper spacing and clearance, I prefer to cut the die teeth and position the die plate assembly with the breaker assembly in position.

As pointed out above, the bodies of the hubs 330 extend beyond the projections 346 on the hubs 331. I prefer to position the die plate 368 so that the ends of the teeth 371 are between adjacent hubs 330 just out of contact with the projections 346 on hubs 331. With the teeth 371 so positioned, if either the shaft, breaker assembly or die plate assembly should become loose and tend to shift, the sides of the hubs 330 would rub against the sides of the teeth 371 and the projections 345 would not hit the teeth 371.

The plate 361 and die support 363 are provided with teeth 373 and 374, respectively, along the edges facing the hubs 330 and 331. The teeth 373 and 374 correspond in number and spacing to the teeth 371 in the die or breaker but are preferably somewhat narrower since the teeth 373 and 374 perform different functions from the teeth 371, and making the teeth 373 and 374 narrower reduces both production and assembly costs. The principal function of the teeth 374 is to support the teeth 371 of the die or breaker. The teeth 373 on plate 361 prevent long, unbroken pieces of wood from passing the die plate assembly 148a and furnish additional support for the teeth 371 of the die plate 368. Preferably, the ends of all three sets of teeth 371, 373 and 374 are substantially the same radial distance from the shaft 64a and the lower ends of the teeth 374 are preferably welded to the teeth 373 to give added support and rigidity. As shown in Figure 16, the teeth 374 are welded to teeth 373 at 383 some distance back from the ends of teeth 373 so that the ends of teeth 373 project outward to check long pieces or slivers which may pass the teeth 371.

A strut or beam 375 extends between a line back of the teeth 373 on the plate 361 and a line back of the teeth 374 on the support 363 thus closing off the space between the plate 361 and die support 363. The strut or beam 375 joins the plate 361 a short distance back from the teeth 373 leaving a small horizontal shelf 376. Long pieces or slivers of wood which pass between the teeth 371 and 373 are caught by this shelf 376 and broken by the breaker elements before passing the die plate assembly. The strut or beam 375 is preferably welded to plate 361 and support 363 to prevent excess air from entering between plate 361 and support 363.

To further insure against long strips or slivers of wood passing the breaking area, a member 377, having teeth 378 and a shelf portion 379, may be welded or otherwise secured to the brace 366 below the plate 361. Any long strips or slivers which pass the teeth 371 of the die plate 368 and the teeth 373 or shelf 376 would be stopped by the member 377 and broken by the projections 345.

As shown in Figure 16, the die plate 368 is preferably positioned so that the outer ends of the projections 345 on hubs 330 first enter the spaces between the teeth 371. This tends to pull the wood into the breaking area and results in faster more satisfactory breaking. Logs and cores especially have some tendency to roll on top of the breaker assembly and striking these logs and cores with the outer edge of the wear plate breaks and splits the logs and cores into non-cylindrical pieces which have only slight tendency to roll and which are then rapidly broken up by the breaker mechanism 42.

Opposite the plate 361 a horizontal plate 380 is mounted on wall 48 and an upright longitudinal wall 381 spaced from wall 48. This plate 380 is provided with teeth 382 corresponding in number and position relative to the hubs 330 and 331 with the teeth 373 on plate 361. The plate 380 and teeth 382 reduce the passage of air past the breaker assembly and also prevent reduced waste from following the hubs 330 and 331 back to the breaking area.

Wood to be reduced in the breaker mechanism of Figures 19 and 20 is inserted into a hopper of suitable form mounted above said breaker mechanism. A portion of a hopper of the type shown in Figure 1, comprising upper and lower sections 210 and 212, is indicated in Figure 19, with like parts being identified by like numerals. The lower portion of plate 228 meets horizontal plate 380 just back of teeth 382 thereby serving as a baffle plate so that wood to be broken cannot rest on plate 380 out of the reach of projecting rotary teeth 345.

A solid trough 208a (broken away in Figure 16) extends below breaker mechanism 42 between longitudinal walls 364 and 381 from adjacent the open end of the breaker apparatus frame (such as 209 as shown in Figure 2) to a point adjacent the other end of the frame where it is connected to a central fan housing opening (such as 256 as shown in Figure 2).

Each of the breaker mechanisms 42 in the modifications of Figures 14–15 and 16–17, respectively, has the same principle of operation as heretofore described in connection with the embodiment of Figures 1–12. Further, the rotary breaker units of the embodiments of Figures 1–12 and 14–15, respectively, may be used with the die plate assembly 148a of the embodiment in Figures 16–17. Similarly, the rotary breaker unit 79a of the embodiment in Figures 16–17 may be used with the improved adjustable breaker die 148 of the embodiments in Figures 1–13 and Figures 14–15, respectively.

Each of the modifications of Figures 14–15 and Figures 16–17 are fully operative and have proven in actual use to be highly efficient and successful wood reduction and handling mechanisms, far superior to any known prior art wood reducing devices. As has been previously pointed out in some detail, the preferred embodiment of the present invention disclosed in Figures 1–13 includes a number of novel improvements which make the breaker apparatus considerably more efficient and economical in actual wood reduction operation. Also, these improvements make it simpler and more economical in construction with more adjustability, accessibility and replaceability of important working parts. Further, these novel improvements increase protection against the high rate of machine wear inherent in scrap wood reduction thereby achieving lower maintenance and replacement costs. Other similar advantages discussed above are also achieved.

Referring particularly to Figures 1–4, blower system 44 comprises a fan housing 255 having a top section 260 and a bottom section 262. Sections 260 and 262 are secured together by a plurality of bolts 264 and form a pair of substantially circular parallel walls 258 and 259 which are connected by an outer peripheral wall 261 concentric with shaft 64 to form a substantially closed and cylindrical housing having a central substantially circular opening 256 in wall 258. An outlet pipe 263 extends upward tangentially from fan housing 255 as shown in Figure 1. A curved tapering plate section 266 is connected at one end to wall 172 surrounding a semi-circular cut-out 265 at the bottom thereof, and at its other end to wall 258 of upper fan housing section 260, thereby surrounding the upper half of opening 256 and completing a closed conduit section between fan unit 44 and the adjacent end of breaker apparatus 42. All joints in fan housing 44 are preferably welded so as to be substantially air tight.

A centrifugal fan, indicated generally at 270 is mounted on the shaft 64 between the walls 258 and 259. The fan 270 consists of a central hub 271 which is fixed to the shaft 64 by a tapered bushing 272 which is non-rotatably fixed to the shaft 28 by a suitable key 293, and to hub 271 by a press taper fit. A plurality of flat radially disposed blades 274 are fixed on the hub 271 in planes substantially radiating from the axis of the shaft 64. Plates 275 are secured between the blades 274 at the outer ends of the blades adjacent wall 259 and plates 276 are secured between the blades 274 and extend from the plate 275 towards wall 258 to the hub 271. The plates 276 thus form a triangular surface with the apex facing the opening 256 in wall 258.

The blades 274, plates 275 and plates 276 are of thick heavy metal so that the fan 270 has a strong flywheel effect permitting the use of a relatively small source of power. The plates 275 and 276 serve to reinforce the blades 274 and also serve as impact plates as hereinafter described.

As previously noted, sand, pebbles, grit and the like are generally present in the scrap lumber, bark, etc. to be reduced. These foreign elements unavoidably find their way into the breaker assembly and are thus inevitably present in trough 208 and the blower system 44. In operation, shaft 64 carrying rotary breaker assembly 79 and fan 270 is driven at a relatively high speed of about 800 to 1600 R. P. M. for efficient operation of the blower system 44. As a result, this sand and grit is picked up together with reduced wood by the air stream created by the fan and is impelled against the fan blades and the inside of fan housing 255 with great speed and force. This produces a sand blasting effect which wears away elements of fan 270 and fan housing 255 and necessitates costly replacement and repair. The wear is particularly acute on the fan blade elements and in the vicinity of the part of housing 255 which is cut away at 257 in Figure 1. Wear of the housing in this area is particularly acute due to the sharp change in the direction of the air stream and matter suspended therein, in order that the matter may be blown into tangential outlet pipe 263.

The present invention includes a novel inexpensive means for minimizing this highly undesirable and costly wear in fan system 44. As shown in Figures 1 and 2, a series of small steel rods 268 are welded to the inside of peripheral wall 261, and a series of similar rods 269 are welded on the forward side of each of blades 274. In operation, rods 268 and 269 cause reduced wood and trash to collect between them and build up a layer on the peripheral wall 261 and the forward surfaces of blades 274 as indicated at 277 and 278, respectively, in Figure 1. Thus the abrasive sand and grit particles impelled against the fan blades and peripheral wall 261 wear away on a protective layer of grit and trash, thereby reducing to a minimum the sand blasting effect and resultant wear on the fan and housing parts themselves. Rods 268 and 269 will be worn away to some extent but, replacement of these is easy and inexpensive, and obviously is far less costly and time consuming than replacement of fans, fan blades and fan housing elements such as peripheral wall 261.

The operation of an effective wood reducing and handling system employing the novel blower type wood reduction apparatus of the present invention can be best understood from Figure 18. Wood to be reduced, wood waste or pulp wood, may be fed to the breaker by a conveyor belt 254 which passes over a pulley 251 adjacent the open front end of the hopper 212 above upper front wall section 245 and drops into the hopper. The wood falls into the lower hopper section 210, is broken and reduced to small pieces by the breaker mechanism 42, and then drops into the trough 208, after passing through the openings 192 of screen 190 when such screen is used.

The fan 270 draws air at high velocity into the inlet 209, through the channel 211, formed by walls 46 and 48 and trough 208, where the moving air picks up the broken wood, and thence through the central opening 256 into the fan housing 255. The air and the reduced wood strike the plates 276 and are directed outward toward the peripheral wall 261 of the fan housing. The plates 276 and 275 thus protect the wall 259 from the impact of relatively hard and heavy pieces of wood and foreign substances which are travelling at high velocity and would otherwise pass between the blades 274. These plates 276 positively deflect the air and wood outward. The air and wood are then blown out of the fan housing through the outlet pipe 263.

In order to move the reduced wood to a place of disposal, a conveyor pipe 297 is attached to the outlet 263. The wood travels along this pipe 297 in the moving stream of air to a collector indicated schematically at 298, and is dropped from the collector 298 through a conduit 299. Suitable collectors are well known in the art and are widely used as dust collectors.

There is a substantial amount of suction at the inlet 209. A removable inlet 301 (shown in dotted lines in Figures 1 and 3) may be attached to end wall 50 so that a pipe or other suitable conduit may be attached to the inlet 301 to utilize this suction to draw light waste such as sawdust or shavings directly into the channel 211 and into the fan system 44 without passing through the breaker apparatus 42. In this way, all forms of such waste may be handled in a single wood handling system.

I have found that the moving stream of air takes up the moisture from reduced pieces of wet wood so that when the reduced wood reaches the collector 298 it is substantially dry regardless of its condition when placed in the breaker. Thus a water saturated core or log dropped into the hopper 212 is dropped from the collector 298 as small dry pieces, suitable for use as fuel a few moments later.

In order to properly transport the reduced wood, the air in the pipe 297 should be travelling at not less than 3500 feet per minute. The fan 270 is rotated at a speed to give the proper air velocity and, in the embodiments shown in Figures 1–17, this determines the speed of the breaker assembly. Some air enters the system through the breaker mechanism but the major portion should enter through the inlet 209. In order to insure proper movement of the reduced wood through the channel 211 and through the pipe 297, the cross sectional area of the channel 211 preferably should not be greater or smaller than the cross sectional area of the pipe 297 by more than thirty-seven and one-half percent, although this ratio may be varied.

Referring to Figures 19 and 20, there is disclosed therein a modified non-blower type of breaker apparatus. This embodiment is substantially identical with the various embodiments of blower type breaker apparatus heretofore discussed, with the exceptions that suitable limited modifications are made to accommodate a novel combination pulley and fly wheel installation 302 in place of fan system 44. For clarity, like numerals will be used to identify like parts.

A breaker mechanism 42 comprising a rotary breaker 79 and fixed breaker die 148 is mounted on frame 41a, with hopper 207 supported thereon, and with rotary breaker shaft 64 supported in bearings 60 and 62 on plates 56 and 58 at the ends of frame 41a as in the embodiment of Figures 1 to 13. A fly wheel installation 301 is non-rotatably mounted on shaft 64 between breaker mechanism 42 and bearing 60, as is the fan system 44 of the blower type breaker apparatus of Figures 1–13. A cover plate 329 is also provided as a safeguard.

Referring particularly to the partial cross section of Figure 21, there is disclosed therein a fly wheel and pulley installation indicated generally at 302 for a further modification of a non-blower type of breaker apparatus. The embodiment of Figure 21 is designed primarily for the paper industry wherein enormous quantities of tramp iron are encountered. This tramp iron contains particularly a considerable quantity of manganese steel which is not caught by magnets or magnetic pulleys and finds its way into the hopper 207 and breaker mechanism 42. This embodiment is substantially identical with the various embodiments of blower type breaker apparatus heretofore discussed with the exception that the fan system 44 is omitted and a fly wheel sheave installation indicated generally at 302 is mounted on shaft 64 outside of bearing 60 in place of the pulley 66 shown in Figure 2.

Referring particularly to Figure 21, fly wheel and pulley installation 302 comprises a bushing 303 non-rotatably keyed to shaft 64 by means not shown and having an externally tapered surface 304. A second bushing 306 having a corresponding tapered bore 304' is press fitted to bushing 303 and has an annular flange 309 laterally extending from one end. Flange 309 may be formed integrally with bushing 306 in any suitable manner, or may comprise an annular ring welded thereto at one end as shown in Figure 21.

Bushing 303 has a groove 308 which receives a rotatable ring 311. Ring 311 is provided with two sets of holes. One set of holes consists of a plurality of circumferentially spaced holes 315 through which a plurality of hollow head cap screws 305 are inserted and threaded into a plurality of corresponding circumferentially threaded bores 307 in the end of bushing 306. To tighten bushing 306 on bushing 303 to obtain a press fit the cap screws 305 are tightened in holes 307 until the corresponding tapered surfaces 304 and 304' are thoroughly press fitted together. Another set of circumferentially spaced holes, not shown, but similar to holes 315, are also provided in annular ring 311, and serve to enable easy removal of bushing 306 from bushing 303. To remove bushing 306 from bushing 303 cap screws 305 are removed from holes 307 and 315 and inserted into the threaded holes, not shown, and screwed therein until the ends of the cap bolts bear against the adjacent end of bushing 306. Continued rotation of the cap screws forces bushing 306 to the left in Figure 21 thereby pushing that bushing and the fly wheel 316 attached thereto off of tapered bushing 303 so that it may be removed from the shaft if desired.

A conventional roller type anti-friction bearing 312 is mounted on shaft 64 with its inner race non-rotatably secured to shaft 64 and its outer race 314 supporting fly wheel 316. Fly wheel 316 is held securely in place on outer bearing race 314 between shoulder 318 formed in the flywheel's inner bore 317 and the shoulder 319 formed by annular flange ring 320 which is secured to flywheel 316 concentric with shaft 64. Ring 320 is secured by a plurality of cap screws 321 extending through circumferentially spaced holes 322 in said ring and corresponding threaded holes 323 in flywheel 316. The web portion of flywheel 316 and flange 309 has a plurality of corresponding circumferentially spaced holes 324 and 310, respectively, which receive a plurality of shear pins 325 preferably made of bronze. Shear pin holes 310 and 324 preferably have counterbores at 313 and 326, respectively, to receive a pair of annular hardened steel inserts 327. The outer periphery of flywheel 316 preferably has a plurality of circumferential V-grooves 328 machined therein to receive a V-type drive belt not shown so that flywheel 316 is also used as a drive input pulley for breaker shaft 64. However, the outer periphery of flywheel 316 may comprise a flat cylinder for receiving a flat belt drive.

The use of the improved pulley-flywheel installation 302 of the present invention provides not only a drive means but also an overload protection means for shaft 64 and the breaker apparatus 42. In the event of overload, pins 325 will shear, thereby breaking driving connection between flywheel 316 and flange 309 which is non-rotatably connected to rotor shaft 64 as previously described. Pulley-flywheel 316 being secured to outer race 314 of roller bearing 312 is then able to rotate freely relative to shaft 64 and associated flange 309 so that no drive input is transmitted from flywheel 316 to shaft 64. Bushings 327 and counterbores 313 and 316 may be omitted, but when provided as shown these bushings do the actual shearing of shear pins 325 upon overload, and this prevents wallowing or mutilation of the shear pin holes 324 and 310.

In operation it occasionally happens that such enormous pieces of steel get into the breaker apparatus 42 that despite the shear pin protection in the breaker rings such pieces stop the breaker mechanism completely. When this happens, the drive motor which continues to run has caused the drive belts which drive the pulley on shaft 4 to catch fire, and on some occasions has actually caused the motor windings to be burned out. The novel fly wheel-pulley device 302 of Figure 21 protects the motor and the V-belts in case of such an eventuality.

A modified form of upper hopper structure 212b is shown in Figure 20. The upper hopper 212b of this embodiment has a curved wall 217 and a straight wall 219, as shown in Figure 20, with said walls being connected by side walls 242 and 244 which is not shown.

It is apparent that wood reduced in the non-blower breaker apparatus embodiment of Figures 19–21 may be removed by a separate blower system from the channel 211 below the breaker mechanism 42.

Alternatively, it may be removed by means other than a fan, such a belt conveyor system as schematically disclosed in Figures 19 and 20.

The frame 41a of the non-blower type breaker apparatus is modified slightly with plate 208 in the embodiments of Figures 1 to 13 being omitted and side walls 46 and 48 extending directly down to base plate 40. Two transverse solid plates 61 and 63 are mounted between side walls 46 and 48 directly below plates 172 and 174, respectively being connected to side walls 46 and 48, base plate 40 and plates 150 and 186. A hole 65 is cut in the base plate 40 as indicated at 65 in Figures 19 and 20 to permit broken wood to be discharged through the base plate 40 onto a conveyor 69 passing over pulley 71 below holes 65. The entire breaker mechanism is mounted on a raised platform indicated schematically at 73 above the conveyor belt 69.

For most uses of the wood reduction apparatus disclosed herein, hoppers incorporating the features shown in the schematic representation of Figure 22 have been found preferable.

Referring to Figure 22, hopper 207c has front and rear walls 245c and 246c, respectively, which are connected by side walls not shown. When the teeth on rotor 79 strike falling wood adjacent forward wall 245c, they impart to such wood both a horizontal and vertical component of force. The base of inlet wall 245c is substantially vertical and is as close as is practical to a vertical plane through the axis of shaft 64. This minimizes the vertical component of force imparted to falling wood struck by the teeth on rotor 79, and helps prevent such wood from being propelled upward and out of opening 248c. It also tends to cause such wood to be thrown towards the fixed breaker, diagrammatically indicated at 148, thereby minimizing ineffectual tossing about of wood fed into the hopper. The rear wall 246c is preferably inclined at an angle between 12½° and 20° from the vertical, as indicated in Figure 22. A top 247c extends from the top of rear wall and some distance beyond the plane of the bottom of forward wall 245c. When the rear wall 246c is inclined within the angular limits indicated, falling wood struck by the teeth on rotor 79 and propelled upward and against the rear wall 246c is prevented from being "banked" out of the opening 248c. This is important since wood flying out of opening 248c is a menace to workmen and other objects nearby.

Although the breaker apparatus of the present invention is primarily designed for reducing waste woods of all types, this breaker apparatus has utility as an auxiliary chipper in the production of wood pulp. The conventional chippers used in the production of wood pulp must reduce the raw wood to relatively small chips, and a high rate of wear in the working chip reducing parts of the chipper is experienced when large pieces of raw wood are fed to it. The breaker apparatus o fthe present invention being very rugged and sturdy, may be used as the first unit of a two stage chipper system. The raw wood, which may be relatively large log sections, is first reduced to a relatively large chip in the breaker apparatus. It is then blown by the breaker fan system to a conventional wood pulp chipper wherein it is further reduced to wood pulp chips of suitable size. Use of the breaker apparatus in conjunction with a conventional chipper in this manner greatly reduces the wear in the chipper and maintenance cost for keeping the same in suitable operating condition.

Throughout the specification, parts have been described as welded together and it is to be understood that the parts could be secured together by other means. However, because of the power of this apparatus and the difficulty of the work it performs permanent rigidity of the parts is essential and welding is generally preferred.

From the foregoing it is apparent that I am able to attain the objects of my invention and provide a simple and efficient apparatus for reducing woods of all types and in any condition, and to also provide a system for converting wet wood into dry, easily handled fuel.

The present invention may be embodied in other specific forms without departing from the spirit or essential characteristics thereof, and the present embodiments are therefore to be considered in all respects as illustrative and not restrictive. The scope of the invention is indicated by the appended claims rather than by the foregoing description and all changes which come within the meaning and range of equivalency of the claims are therefore intended to be embraced therein.

What is claimed and desired to be secured by United States Letters Patent is:

1. A wood breaking mechanism comprising a support, a fixed breaker carried by said support and having teeth along one edge, a rotor rotatably mounted on said support, said fixed breaker having a surface inclined downwardly toward said rotor, a plurality of longitudinally spaced long teeth projecting outwardly from said rotor between the teeth on said fixed breaker, and short teeth projecting outwardly into wood breaking relation to a point adjacent the ends of the teeth on said fixed breaker, said short teeth being substantially as wide as the axial spacing between said long teeth.

2. Apparatus as defined in claim 1 in which the teeth on said rotor are angularly spaced longitudinally of said rotor to balance said rotor.

3. A wood breaking mechanism comprising a support, a rotor rotatably mounted on said support, a plurality of long teeth projecting from said rotor, said long teeth being spaced axially on said rotor, a plurality of short teeth projecting from said rotor, said short teeth being spaced axially on said rotor alternately with said large teeth, the width of said short teeth being not substantially less than the axial spacing between said large teeth, a fixed breaker, teeth on said fixed breaker spaced to permit passage of the large teeth on said rotor, and means for securing said fixed breaker on said support with the ends of the teeth of the fixed breaker in wood breaking relation to the short teeth on said rotor and with the fixed breaker having a surface inclined downwardly and inwardly toward said rotor to that wood engaging said surface will move by gravity toward said rotor.

4. A wood breaking mechanism as defined in claim 3 including toothed plates on opposite sides of said rotor in substantially the same horizontal plane, the teeth of said plates projecting between the long teeth of said rotor into close proximity with the short teeth of the rotor.

5. A wood breaking mechanism as defined in claim 4 having a channel extending beneath said rotor longitudinally thereof, the rotor and plates forming the top of said channel, one end of said channel being open, a centrifugal fan, and means connecting the other end of said channel to the suction side of said fan.

6. Wood reducing apparatus comprising a support, a shaft rotatably mounted on said support, wood breaking members carried by said shaft, a fixed breaker carried by said support in operative relation to said wood breaking members, a channel extending longitudinally beneath said shaft and extending beyond said members, a fan housing, a centrifugal fan in said housing, means connecting one end of said channel to the central portion of said fan housing, the other end of said channel being directly open to the atmosphere, and a plate extending from the side of said channel into close proximity to said members for reducing the flow of air past said shaft, members and fixed breaker into said channel.

7. Apparatus as defined in claim 6 in which said fan is mounted on said shaft and includes means for positively deflecting air and broken wood radially, comprising plates between said fan blades inclined outwardly and away from said channel.

8. Apparatus as defined in claim 7 in which the fixed breaker has an inclined upper surface and teeth projecting toward said shaft, and in which the shaft carries long wood breaking members projecting between the teeth of said fixed breaker and short wood breakers extending towards the ends of said teeth.

9. A wood breaker comprising a support, a rotor rotatably mounted on said support, said rotor having alternate large and small substantially cylindrical portions throughout its length, a tooth projecting substantially radially from each large portion and a tooth projecting substantially radially from each small portion, the radii of the large portions of said rotor being greater than the distances from the rotor axis to the outer edges of the teeth on the small portions of said rotor, a fixed breaker carried by said support, said fixed breaker having teeth formed along one edge, the teeth on said breaker being narrower than the space between adjacent large portions of said rotor and extending between adjacent large portions of said rotor into wood breaking relationship with the teeth on the small portions of said rotor and means for rotating said rotor.

10. Apparatus as defined in claim 9 in which each large portion carries a single tooth and the teeth on successive large portions of said rotor are angularly spaced along said rotor to balance said rotor.

11. In a wood breaker, a support, a member rotatably mounted on said support, a plurality of large rings and small rings mounted on said member coaxially with said member and spaced alternately along said member, a tooth projecting substantially radially from each large ring, a tooth projecting substantially radially from each small ring, the distance from the axis of said member to the outer edge of the tooth on each small ring being less than the radius of the large rings, means non-rotatably securing said rings to said member, a fixed breaker having teeth along one face adjacent said member, said teeth extending between said large rings into wood breaking relation to the teeth on said small rings.

12. A wood breaker as defined in claim 11 in which each ring carries a single tooth and the teeth on successive rings are angularly spaced so as to balance the member.

13. Apparatus of the character described comprising a horizontal shaft, means for rotatably supporting said shaft, a rotary wood breaker rotatably mounted on said shaft adjacent one end thereof, spaced long projections on said rotary breaker, a fixed breaker means having teeth along one edge, the teeth on said fixed breaker means being narrower than the spaces between long projections on such rotary breaker, means for supporting said fixed breaker means so that the teeth thereof extend between said projections, short projections on said rotary breaker between said long projections and extending outward from said rotary breaker toward the ends of said fixed breaker teeth, a conduit, means for supporting said conduit beneath said rotary breaker and fixed breaker, said conduit being open at its top beneath said breakers, a fan housing adjacent the other end of said shaft, said housing having an inlet substantially concentric with said shaft and an outlet adjacent the periphery of said housing, a centrifugal fan having radial blades mounted on said shaft within said housing, means operably connecting one end of said conduit to said housing inlet, the other end of said conduit being open directly to the atmosphere, deflecting means on said fan for positively directing air entering said inlet outwardly radially of said fan, and means rotating such shaft.

14. Apparatus of the character described comprising a horizontal shaft, means for rotatably supporting said shaft, a wood breaker rotatably mounted on said shaft adjacent one end thereof, spaced long projections on said breaker, a die plate having teeth along one edge, the teeth on said die plate being narrower than the spaces between the long projections on said breaker, a plate, means for supporting said plate in substantially the same horizontal plane as the axis of rotation of the shaft, a die plate support carried by said plate at an acute angle thereto inclined toward said shaft, means for adjustably securing said die plate on said die plate support with the teeth of said die plate extending between said projections, short projections on said breaker between said long projection extending outward from said breaker toward the ends of said teeth, a channel, means for supporting said channel beneath said breaker and die plate, a fan housing adjacent the other end of said shaft, said housing having an inlet opening substantially concentric with said shaft and an outlet opening adjacent the periphery of said housing, a centrifugal fan having radial blades mounted on said shaft within said housing, means operatively connecting said channel to said inlet opening, deflecting means on said fan for positively directing air entering said inlet opening outward radially of said fan, and means for rotating said shaft.

15. Apparatus as defined in claim 14 in which said plate and die plate support have teeth along their edges adjacent said shaft, the teeth on said plate and said die plate support corresponding in number and spacing to the teeth on said die plate and in alignment therewith.

16. In a wood breaker mechanism a rotary member, a plurality of large rings and a plurality of small rings spaced alternately along said member, a single tooth projecting substantially radially from each large ring, said teeth being positioned in a spiral extending entirely around said member, a single tooth projecting substantially radially from each small ring, the teeth on said small rings being positioned in a spiral extending entirely around said member, pin means extending radially through each ring into said mmeber for preventing relative rotation of said ring on said member, a fixed support, a fixed breaker mounted on said support, said fixed breaker comprising a plurality of long breaker elements and short breaker elements spaced alternately on said support with the long breaker elements opposite the small rings and the short breaker elements opposite the large rings, and means for moving said breaker elements toward or from the rings.

17. A wood breaker mechanism as defined in claim 16 in which the distance from the axis of said rotary member to the outer surface of the tooth on each small ring is less than the outer radius of each large ring, and in which the long breaker elements project between the large rings.

18. In a wood breaker a support, a member rotatably mounted on said support, a plurality of large rings and a plurality of small rings mounted on said member coaxially with said member and spaced alternately along said member, a single tooth projecting substantially radially from each large ring, a single tooth projecting substantially radially from each small ring, the distance from the axis of said member to the outer edge of the tooth on each small ring being less than the radius of the large rings, a breakable element extending radially through each ring into said member for securing such ring to said member, a fixed breaker having teeth along one face adjacent said member, said teeth extending between said large rings into wood breaking relation to the teeth on said small rings.

19. A wood breaker as defined in claim 18 in which the teeth on successive rings are angularly spaced so as to balance the member.

20. In a wood breaker mechanim, a rotary member, a plurality of large rings and a plurality of small rings spaced alternately along said member, a single tooth projecting substantially radially from each large ring, a single tooth projecting substantially radially from each small ring, a pin means extending radially through each ring into said member for preventing relative rotation of said rings on said member, a fixed support, a fixed breaker mounted on said support, said fixed breaker comprising a plurality of long breaker elements and short breaker elements spaced alternately on said support with the long breaker elements opposite the small rings and the short breaker elements opposite the large rings, and means for moving said breaker elements toward or away from said rings.

21. In a wood breaker mechanism, a rotary member, a plurality of large rings and a plurality of small rings spaced alternately along said member, independent means for fastening each ring non-rotatably to said member, a single tooth projecting substantially radially from each large ring, a single tooth projecting substantially radially from each small ring, a fixed support, a fixed breaker mounted on said support, said fixed breaker comprising a plurality of long breaker elements and short breaker elements spaced alternately on said support with the long breaker elements opposite the small rings and the short breaker elements opposite the large rings, and means for moving said breaker elements toward or away from said rings.

22. In a wood breaker, a support, a member rotatably mounted on said support, a plurality of ring units comprising a large and small ring mounted on said member with said large and small rings spaced alternately on said member, a single tooth projecting substantially radially from each large ring, a single tooth projecting substantially radially from each small ring, a breakable element extending radially through each ring unit into said member for securing such unit to said member, a fixed breaker on said support having tooth-like elements along one edge and adjacent said member, said tooth-like elements extending between said large rings into wood breaking relation to the teeth on said small rings.

23. In a wood breaker, a support, a member rotatably mounted on said support, a plurality of ring units comprising a large and small ring mounted on said member with said large and small rings spaced alternately along said member, an enlarged projection extending substantially radially from the large rings of said units and having a tooth receiving section on the forward portion thereof, a second tooth receiving section on each of said small rings adjacent the rearward portion of said projection, a first removable tooth in said first section and a second removable tooth in said second section on each ring unit, and means for simultaneously securing said large and small teeth to each of said ring units, said first and second teeth projecting substantially radially from said large and small rings respectively, means for securing said ring units to said member, a fixed breaker on said support having tooth-like elements along one edge adjacent said member and extending between said large rings into wood breaking relation to the teeth on said small rings.

24. In a wood breaker, a support, a member rotatably mounted on said support, a plurality of ring units comprising a large and small ring mounted on said member with said large and small rings spaced alternately along said member, an enlarged projection extending substantially radially from each large ring of said ring units and having a tooth receiving recess on the forward portion thereof, a second recess in each small ring of said ring units adjacent the rearward portion of said projection, an extension on the rearward portion of each of said projections having a sloping surface, a first removable tooth in said first recess and a second removable tooth in said second recess of each ring unit, and wedge means on each ring unit operatively connected with said first tooth and cooperating with said sloping surface and a top portion of said second tooth for simultaneously securing said first and second teeth to each of said ring units, said first and second teeth projecting substantially radially from said large and small rings respectively, means for securing said ring units to said member, a fixed breaker on said support having tooth-like elements along one edge adjacent said member, said teeth extending between said large rings into wood breaking relation to the teeth on said small rings.

25. In a wood breaker, a support, a member rotatably mounted on said support, a plurality of ring units comprising a large and small ring mounted on said member with said large and small rings spaced alternately along said member, means on each of said ring units for receiving a first tooth projecting substantially radially from said large rings and a second tooth projecting substantially radially from said small rings, means on each of said ring units for simultaneously securing said first and second teeth to said large and small rings respectively, means for securing said ring units to said member, a fixed breaker having teeth along one face adjacent said member, said teeth extending between said large rings into wood breaking relation to the teeth on said small rings.

26. In a wood breaker, a support, a member rotatably mounted on said support, a plurality of ring units comprising a large and small ring mounted on said member with said large and small rings spaced alternately along said member, means on said ring units receiving a first tooth projecting substantially radially from each of said large rings and a second tooth projecting substantially radially from each of said small rings, the distance from the axis of said member to the outer edge of the teeth on each of said small rings being less than the radius of said large rings, means on each ring unit for simultaneously securing said first and second teeth to said large and small rings respectively, means for connecting said ring units to said member, a fixed breaker having teeth along one face adjacent said member, said teeth extending between said large rings into wood breaking relation to the teeth on said small rings.

27. In a wood breaker, a support, a member rotatably mounted on said support, a plurality of ring units comprising a large and small ring mounted on said member with said large and small rings spaced alternately along said member, means on each of said ring units receiving a first tooth projecting substantially radially from each of said large rings and a second tooth projecting substantially radially from each of said small rings, the distance from the axis of said member to the outer edge of the teeth on each of said small rings being greater than the radius of said large rings, means on each of said ring units for simultaneously securing said first and second teeth to said large and small rings respectively, means for securing said ring units to said member, a fixed breaker having teeth along one face adjacent said member, said teeth extending between said large rings into wood breaking relation to the teeth on said small rings.

28. In a wood breaker, a support, a rotor rotatably mounted on said support, said rotor having large sections and small sections alternately, a fixed breaker carried by said support and having tooth-like elements along one edge, said fixed breaker being positioned with the ends of said tooth-like elements projecting between said large portions of said rotor, a tooth projecting substantially radially from each large section of the rotor between adjacent tooth-like elements of said fixed breaker and having a top, forward and side surfaces, and a tooth projecting substantially radially from each small section toward the ends of the teeth on said fixed breaker and having a top and forward surfaces, an inlay of hard material on the top surface of each of said teeth adjacent its forward surface, each of said inlays having a relatively narrow dimension on the forward surface of the tooth and a relatively wide dimension on the top surface of the tooth, whereby said inlays prevent wear of said teeth from abrasion and the like, and further act as continuously self-sharpening, hard cutting edges, thereby producing a simultaneous punching and cutting action between said rotor and said fixed breaker.

29. In a breaker apparatus, a support, a rotor rotatably mounted on said support, said rotor having large sections and small sections alternately, a fixed breaker carried by said support and having tooth-like elements along one edge, said fixed breaker being positioned with the ends of said tooth-like elements projecting between the large sections of said rotor, a tooth projecting substantially radially from each large section of the rotor between adjacent tooth-like elements of said fixed breaker and having a top, forward and side surfaces with an inlay of hard material on each of said surfaces of said teeth, said inlay having a relatively wide dimension on the top and side surfaces of said teeth and a relatively narrow dimension on said forward surface, and a tooth projecting substantially radially from each small section towards the end of the tooth-like elements on said fixed breaker and having a top and forward surface with an inlay of hard material on the top surface of said latter teeth having a relatively narrow dimension on the forward surface thereof, whereby said inlays prevent wear of said teeth from abrasion and the like and further act as a continuously self-sharpening hard cutting edge thereby producing a simultaneous punching and cutting action between said rotor and fixed breaker.

30. In a wood breaker, a support, a member rotatably mounted on said support, a plurality of ring units comprising a large and small ring mounted on said member with said large and small rings spaced alternately along said member, an enlarged projection extending substantially radially from the large rings of each of said units and having a first tooth receiving recess on the forward portion thereof, a second tooth receiving recess on each of said small rings adjacent the rearward portion of said projection, a first removable tooth having front, top and side surfaces in said first recess of each ring unit with an inlay of hard material on each of said surfaces having a relatively wide dimension on said top and side surfaces and a relatively narrow dimension on said forward surface, and a second removable tooth having top and front surfaces in said second recess of each ring unit with an inlay of hard material on said surfaces having a relatively wide dimension on said top surface and a relatively narrow dimension on the forward surface thereof, means on each of said ring units for simultaneously securing said first and second teeth thereto, said first and second teeth projecting substantially radially from said large and small rings respectively, means for securing said ring units to said member thereby forming a rotary breaker, a fixed breaker on said support having teeth along one face adjacent said member and extending between said large rings into wood breaking relation to the teeth on said small rings, whereby said hard inlays prevent wear of said teeth from abrasion and the like and further act as continuously self-sharpening, hard cutting edges thereby producing a simultaneous punching and cutting action between said rotary and fixed breaker.

31. In a breaker apparatus comprising a support having thereon a fixed breaker and rotary breaker cooperating therewith to reduce matter and said rotary breaker having means for receiving a plurality of removable teeth, a removable tooth having forward, top and side surfaces, an inlay of hard material on the top surface of said tooth adjacent said forward surface, said inlay having a relatively wide dimension on said top surface and a relatively narrow dimension on said forward surface, whereby in use said inlay prevents wear of said tooth from abrasion and the like and further acts as a continuously self-sharpening hard cutting edge.

32. In a breaker apparatus comprising a support having a fixed breaker thereon and rotary breaker cooperating therewith to reduce matter and said rotary breaker having means for receiving a plurality of removable teeth, a removable tooth having forward, top and side surfaces, an inlay of hard material on said top and side surfaces of said tooth adjacent said forward surface, said inlay having a relatively wide dimension on said top and side surfaces and a relatively narrow dimension on said forward surface whereby in use said inlays will prevent wear of said tooth from abrasion and the like and further will act as a hard continuously self-sharpening cutting edge.

33. In a wood breaker, a support, a rotor rotatably mounted on said support, said rotor having large sections and small sections alternately, a fixed breaker mounted on said support, said fixed breaker comprising a plurality of long breaker elements and short breaker elements spaced alternately on said support to form a tooth-shaped edge with the long breaker elements opposite said small sections and the short breaker elements opposite said large sections, each of said large breaker elements having a projection with side surfaces and upper and lower slant surfaces, a hard inlay on said side and lower slant surfaces adjacent said upper slant surface, said inlay having a relatively narrow dimension on said upper slant surface and a relatively wide dimension on said side and lower slant surfaces, and each of said small breaker elements having a projection with side surfaces and upper and lower slant surfaces and having a hard inlay on said lower slant surface adjacent said upper slant surface with the inlay having a relatively narrow dimension on said upper slant surface and a relatively wide dimension on said lower slant surface, whereby said inlays prevent wear of said breaker elements from abrasion and the like, and further act as continuously self-sharpening, hard cutting edges, thereby producing a simultaneous punching and cutting action between said rotor and said fixed breaker.

34. In a wood breaker, a support, a rotor comprising a member rotatably mounted on said support and having a plurality of ring units comprising a large and small ring mounted thereon with said large and small rings spaced alternately along said member, means on each of said ring units for receiving a first and second tooth projecting substantially radially from said large and small rings respectively, means on each of said ring units for simultaneously securing said first and second teeth to said large and small rings respectively with said second tooth being angularly spaced slightly behind said first tooth on each ring unit, means for securing said ring units to said member with said tooth receiving means on each ring unit being progressively angularly spaced along said member and substantially lying on a spiral extending around the same, so that said first and second teeth are angularly spaced in a double spiral around said member to achieve improved dynamic balance and reduced stress in said rotor.

35. Apparatus for breaking wood comprising a support, a horizontal shaft rotatably mounted on said support, a breaker fixed on said shaft, said breaker having alternate large and small sections throughout its length, a tooth extending substantially radially from each large section, a tooth extending substantially radially from each small section, the teeth on each small section extending entirely across the space between the teeth on adjacent large sections, a die plate, fixed projecting teeth along one edge of said die plate and means for supporting said die plate at an angle downwardly and inwardly toward said breaker so that wood resting on said die plate will be urged by gravity toward the breaker with the fixed teeth of said die plate extending between the teeth on the large sections, the teeth on the small sections extending to a point adjacent to but spaced from the ends of said fixed teeth and means for rotating said shaft, a second plate, projecting teeth along one edge of said plate, means for supporting said plate in a substantially horizontal plane substantially radial to said shaft with the projecting teeth extending between the teeth on said large sections and adjacent to but spaced from the teeth on said small sections, a die plate support mounted on said second plate at an acute angle thereto, the apex of said angle being adjacent said breaker, teeth along one edge of said die plate support corresponding in number and spacing with the teeth on said second plate and in alignment therewith, the teeth on said die plate support resting on the teeth of said plate adjacent but spaced from the outer ends of the teeth on said plate, and means for securing said die plate on said plate support with the teeth of said die plate resting on the teeth of said die plate support.

References Cited in the file of this patent

UNITED STATES PATENTS

| Number | Name | Date |
|---|---|---|
| 85,067 | Burbank | Dec. 22, 1868 |
| 110,397 | Rusk | Dec. 20, 1870 |
| 214,195 | Rhodes | Apr. 8, 1879 |
| 604,485 | Williams | May 24, 1898 |
| 629,262 | Lombard | July 18, 1899 |
| 766,699 | Jorgensen | Aug. 2, 1904 |
| 920,869 | Hiss | May 4, 1909 |
| 945,496 | Dittbenner | Jan. 4, 1910 |
| 1,100,174 | Dale | June 16, 1914 |
| 1,558,613 | Holland-Letz | Oct. 27, 1925 |
| 1,724,876 | Holbeck | Aug. 13, 1929 |
| 1,729,672 | Jackson | Oct. 1, 1929 |
| 1,770,382 | Armstrong | July 15, 1930 |
| 1,840,380 | Andrews | Jan. 12, 1932 |
| 2,048,509 | Melcher et al. | July 21, 1936 |
| 2,065,677 | Fegley et al. | Dec. 29, 1936 |
| 2,095,385 | Heisserman | Oct. 12, 1937 |
| 2,114,557 | Davis | Apr. 19, 1938 |
| 2,137,388 | Chapman | Nov. 22, 1938 |
| 2,141,662 | Ossing | Dec. 27, 1938 |
| 2,141,663 | Ossing | Dec. 27, 1938 |
| 2,149,289 | Hall | Mar. 7, 1939 |
| 2,225,781 | Hinerfeld | Dec. 24, 1940 |
| 2,261,209 | Beardslee | Nov. 4, 1941 |
| 2,297,604 | Bateman | Sept. 29, 1942 |
| 2,297,782 | Krider | Oct. 6, 1942 |
| 2,321,125 | Brady | June 8, 1943 |
| 2,341,105 | Kueneman et al. | Feb. 8, 1944 |
| 2,367,179 | Arnold | Jan. 16, 1945 |
| 2,381,775 | Roddy | Aug. 7, 1945 |
| 2,393,783 | Kridel | Jan. 29, 1946 |
| 2,440,051 | Lind | Apr. 20, 1948 |
| 2,446,551 | Pauley | Aug. 10, 1948 |
| 2,559,701 | Becker | July 10, 1951 |
| 2,637,502 | Bond | May 5, 1953 |

FOREIGN PATENTS

| Number | Country | Date |
|---|---|---|
| 510,979 | Germany | Oct. 24, 1930 |
| 511,535 | Germany | Oct. 30, 1930 |
| 576,519 | Great Britain | Apr. 8, 1946 |
| 686,451 | France | Apr. 14, 1930 |
| 774,045 | France | Sept. 10, 1934 |

UNITED STATES PATENT OFFICE
CERTIFICATE OF CORRECTION

Patent No. 2,869,793  January 20, 1959

William T. S. Montgomery

It is hereby certified that error appears in the printed specification of the above numbered patent requiring correction and that the said Letters Patent should read as corrected below.

Column 18, line 36, for "d.e" read -- die --; column 21, line 30, strike out "heretofore discussed, with the exceptions that suitable" and insert the same after "apparatus", in line 32, same column; column 26, line 37, for "mmeber" read -- member --; line 70, for "mechanim" read -- mechanism --.

Signed and sealed this 9th day of June 1959.

(SEAL)
Attest:

KARL H. AXLINE
Attesting Officer

ROBERT C. WATSON
Commissioner of Patents